(12) United States Patent
Endoh et al.

(10) Patent No.: US 11,190,120 B2
(45) Date of Patent: Nov. 30, 2021

(54) MOTOR DRIVING DEVICE AND STEERING SYSTEM

(71) Applicant: DENSO CORPORATION, Kariya (JP)

(72) Inventors: Go Endoh, Kariya (JP); Masaya Taki, Kariya (JP); Hiroyasu Otake, Kariya (JP)

(73) Assignee: DENSO CORPORATION, Kariya (JP)

( * ) Notice: Subject to any disclaimer, the term of this patent is extended or adjusted under 35 U.S.C. 154(b) by 76 days.

(21) Appl. No.: 16/571,446

(22) Filed: Sep. 16, 2019

(65) Prior Publication Data

US 2020/0091850 A1 Mar. 19, 2020

(30) Foreign Application Priority Data

Sep. 18, 2018 (JP) .............................. JP2018-174138

(51) Int. Cl.
| | | |
|---|---|---|
| *H02P 21/13* | (2006.01) | |
| *H02P 21/22* | (2016.01) | |
| *B62D 5/04* | (2006.01) | |

(52) U.S. Cl.
CPC ............ *H02P 21/13* (2013.01); *B62D 5/0463* (2013.01); *H02P 21/22* (2016.02); *B62D 5/0412* (2013.01)

(58) Field of Classification Search
CPC ..... B62D 5/0463; B62D 5/0409; H02P 21/22; H02P 27/06; H02P 29/032; H02P 21/13
See application file for complete search history.

(56) References Cited

U.S. PATENT DOCUMENTS

| | | | | |
|---|---|---|---|---|
| 8,237,392 B2* | 8/2012 | Ueda | ..................... | B62D 5/046 318/599 |
| 8,907,602 B2* | 12/2014 | Mukai | .................... | B62D 5/046 318/400.02 |
| 10,457,322 B2* | 10/2019 | Yoshida | ............... | B62D 5/0463 |
| 2004/0026161 A1* | 2/2004 | Takatsuka | ............ | B62D 5/0496 180/446 |
| 2006/0043917 A1* | 3/2006 | Kifuku | ................. | B62D 5/0481 318/432 |
| 2006/0066270 A1* | 3/2006 | Kumagai | .............. | B60T 13/741 318/139 |
| 2008/0042605 A1* | 2/2008 | Subrata | ................. | B60L 15/025 318/449 |
| 2008/0047776 A1* | 2/2008 | Kobayashi | ............. | B62D 5/046 180/446 |

(Continued)

FOREIGN PATENT DOCUMENTS

JP 2018-057166 A 4/2018

*Primary Examiner* — Thai T Dinh

(74) *Attorney, Agent, or Firm* — Maschoff Brennan

(57) ABSTRACT

In a motor driving device, a current detector detects a value of the motor current, and a limit variable calculator calculates a calculation value of a limit variable for limiting the command current. A determiner determines, based on a relationship between the value of the motor current and the calculation value of the limit variable, whether the motor current is in a less-response situation to change of the command current. A current limiter determines whether to limit a value of the command current based on the calculation value of the limit variable in accordance with a result of the determination of whether the motor current is in the less-response situation to change of the command current.

13 Claims, 7 Drawing Sheets

(56) References Cited

U.S. PATENT DOCUMENTS

| | | | |
|---|---|---|---|
| 2009/0079375 A1* | 3/2009 | Suzuki | H02P 21/22 318/434 |
| 2014/0265954 A1* | 9/2014 | Kobayashi | B62D 5/046 318/400.02 |
| 2018/0091081 A1* | 3/2018 | Suzuki | H02P 29/68 |
| 2018/0273090 A1* | 9/2018 | Yoshida | H02P 21/22 |

* cited by examiner

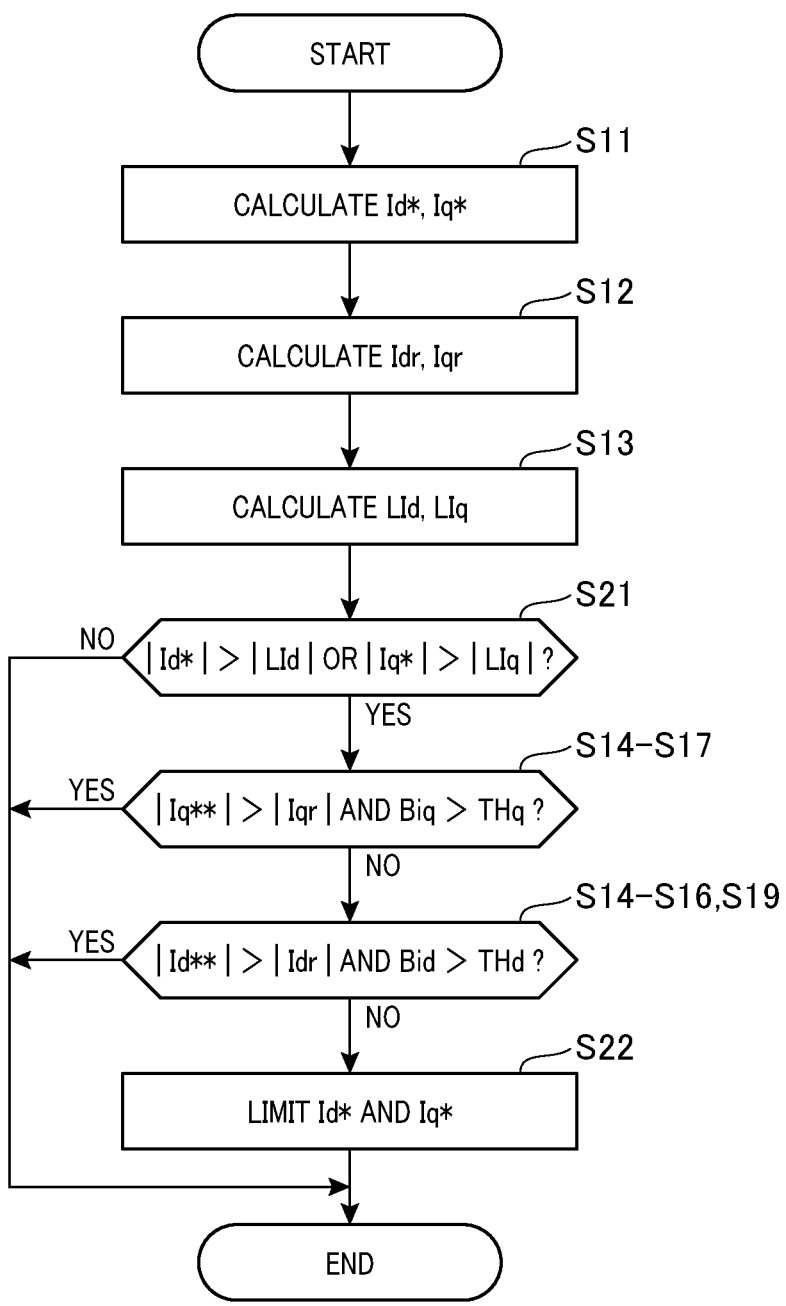

MOTOR DRIVING DEVICE AND STEERING SYSTEM

CROSS-REFERENCE TO RELATED APPLICATION

This application is based on and claims the benefit of priority from earlier Japanese Patent Application No. 2018-174138 filed on Sep. 18, 2018, the description of which is incorporated herein by reference.

TECHNICAL FIELD

The present disclosure relates to a motor driving device that drives a motor, and a steering system that includes the motor driving device.

BACKGROUND

Motor driving devices are each capable of driving a motor. Such a motor drive unit adjusts a current to be supplied to flow in a motor, which will be referred to as a motor current, based on a variable command current value for the motor current to thereby cause the motor current to follow the command current value.

SUMMARY

According to an exemplary aspect of the present disclosure, there is provided a motor driving device for controlling, based on a variable command current, a motor current to be supplied to a motor to thereby drive the motor. The motor driving device includes a determiner configured to determine, based on a relationship between a value of the motor current and a calculation value of a limit variable, whether the motor current is in a less-response situation to change of the command current. The motor driving device includes a current limiter configured to determine whether to limit a value of the command current based on the calculation value of the limit variable in accordance with a result of the determination of whether the motor current is in the less-response situation to change of the command current.

BRIEF DESCRIPTION OF THE DRAWINGS

Other aspects of the present disclosure will become apparent from the following description of embodiments with reference to the accompanying drawings in which:

FIG. 7 is a flowchart schematically illustrating an example of the procedure of a limitation routine carried out by a motor driving device according to a fourth modification of the present disclosure.

DESCRIPTION OF THE EMBODIMENTS

View Point

Figure 1:
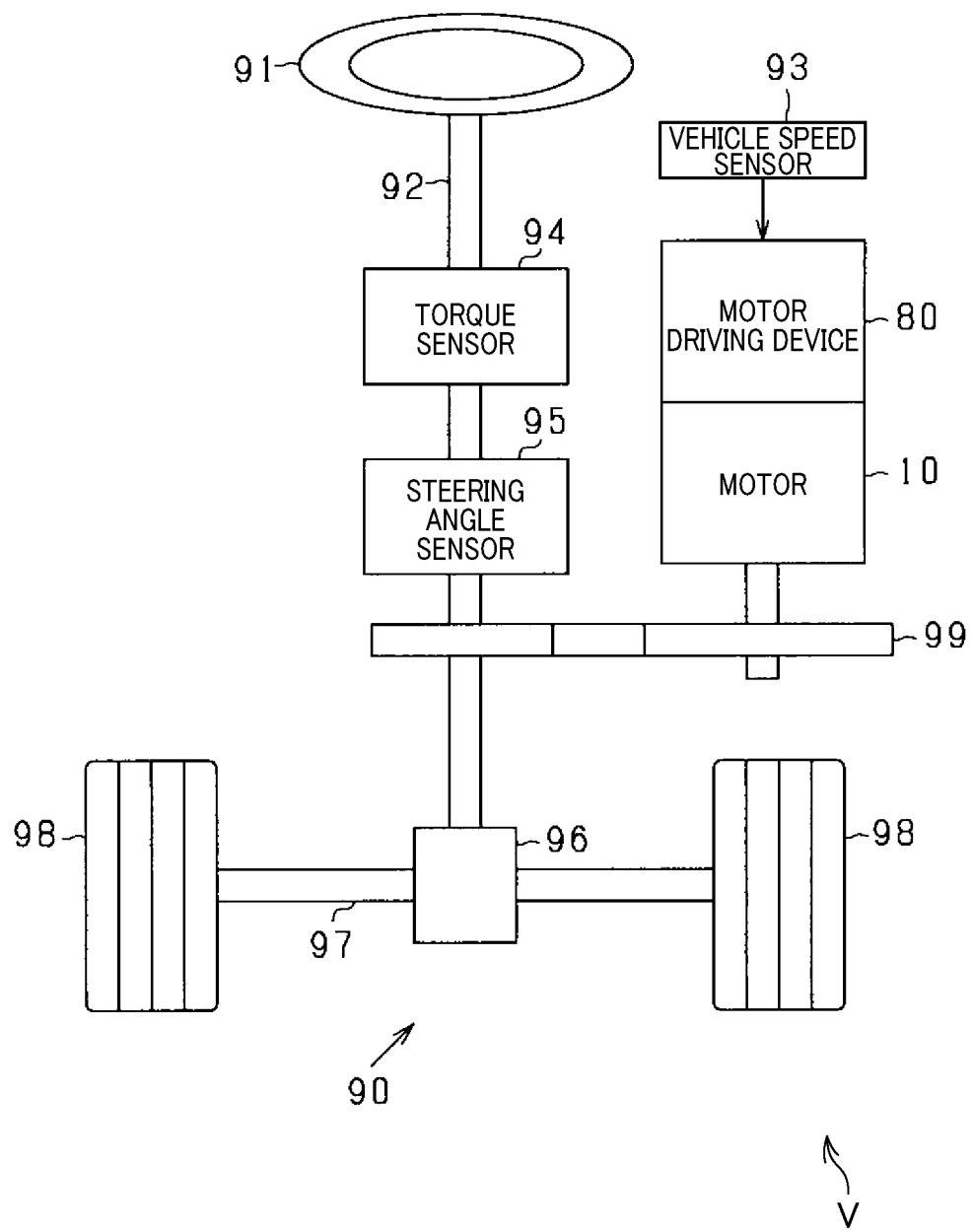
FIG. 1 is a configuration diagram schematically illustrating an example of the configuration of a steering system according to the first embodiment of the present disclosure.

Such a motor driving device for driving a motor performs a feedback operation to adjust a value of the motor current to be supplied to the motor based on a result of comparison between the variable command current value and an actual value of the motor current fed back from the motor.

For example, Japanese Unexamined Patent Application Publication No. 2018-57166A discloses a motor driving device that limits a motor current. Specifically, this motor driving device limits a motor current by correcting, based on a predetermined current limitation value, a command current value for the motor current.

As described above, the motor driving device of the above published patent document limits the command current value for the motor current independently of how the motor current is actually changed.

From this viewpoint, a relative decrease in followability of the motor current with respect to change in the command current value for the motor current may result in a bad situation where the command current value is limited although the motor current is not limited.

If the motor driving device has the function of storing history information indicating the number of times the current command value has been limited as the number of limitations of the motor current, this bad situation may result in the historical information indicating the wrong number of limitations of the motor current.

This may also result in (1) The command current value being erroneously changed due to the bad situation and/or (2) The feedback operation being erroneously performed due to the bad situation This may deteriorate the controllability of the motor, resulting in unintentional sounds being generated from the motor, and/or unintentional vibrations of the motor.

The present disclosure aims to provide motor driving devices each capable of appropriately limiting a command current value for a motor.

EMBODIMENT

From this viewpoint, the following describes embodiments of the present disclosure with reference to the accompanying drawings. In the embodiments, like parts between the embodiments, to which like reference characters are assigned, are omitted or simplified to avoid redundant description.

First Embodiment

A steering system 90 according to the first embodiment will be described with reference to FIGS. 1 to 4. The steering system 90 is mounted on, for example, a vehicle V. The steering system 90 is configured to assist the steering operation of a steering wheel 91 by a driver; this driver's steering operation causes the direction of wheels to be changed.

The steering system 90 shown in FIG. 1 includes the steering wheel 91, a steering shaft 92, a pinion gear 96, a rack axle 97, and a pair of wheels 98.

The steering shaft 92 has opposing first and second ends. The steering wheel 91 is connected to the first end of the steering shaft 92, and the pinion gear 96 is mounted to the second end of the steering shaft 92. The rack axle 97 includes a rod-shaped rack with which the pinion gear 96 is engaged. The rack axle 97 also includes first and second tie rods each having opposing first and second ends. The first end of each of the first and second tie rods is coupled to a corresponding one of both ends of the rod-shaped rack. One of the wheels 98 is mounted to the second end of the first tie rod, and the other of the wheels 98 is also mounted to the second end of the second tie rod.

This configuration allows rotary motion, i.e. torque, of the steering shaft 92 resulting from driver's turning of the steering wheel 91 to be converted into linear motion of the rack of the rack axle 97. This linear motion of the rack of the rack axle 97 causes the wheels 98 to steer via the respective first and second tie rods, thereby changing the direction of the vehicle V.

The steering shaft 92 is provided with a torque sensor 94 and a steering-angle sensor 95. The torque sensor 94 detects a steering torque Ts arising from the operation of the steering wheel 91 by the driver. The steering-angle sensor 95 detects a turning angle of the steering wheel 91 by the driver relative to its neutral position, and also detects the rate of turning, i.e. steering, Vs of the steering wheel 91 by the driver.

The steering system 90 further includes a motor 10, a motor driving device 80, and a reduction gear mechanism 99.

The motor 10 produces a steering-assist torque that assists the driver's turning operation of the steering wheel 91.

Figure 2:
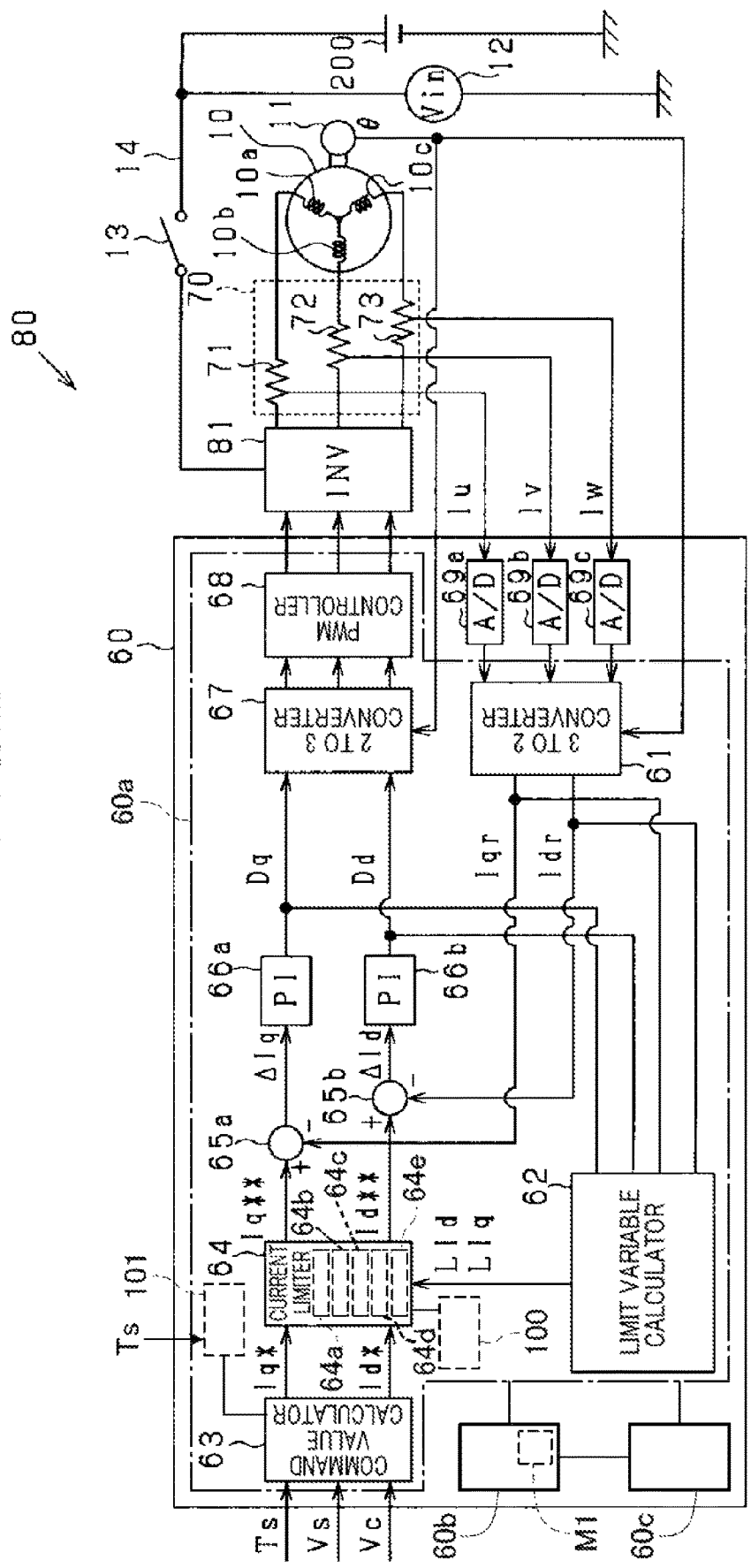
FIG. 2 is a block diagram schematically illustrating an example of the functional configuration of a motor driving device illustrated in FIG. 1.

For example, referring to FIGS. 1 and 2, the motor 10 is designed as, for example, a three-phase alternating-current (AC) motor comprised of, for example, a stator 101, a rotor 102, a rotational shaft 103, and an unillustrated magnetic field member, such as permanent magnets, a field coil, and the like. The stator 101 includes, for example, an unillustrated stator core, and three-phase coils, i.e. U, V, and W-phase coils, 10a, 10b, and 10c. The rotor 102, to which the rotational shaft 103 is mounted, is configured to be rotatable relative to the stator core together with the rotational shaft 103. The three-phase coils 10a, 10b, and 10c are wound in, for example, slots of the stator core and around the stator core. The magnetic field member is mounted to the rotor 102 for generating a magnetic field. That is, the motor 10 is capable of rotating the rotor 102 based on magnetic interactions between the magnetic field generated by the magnetic field member of the rotor 102 and a rotating magnetic field generated by the three-phase coils 10a, 10b, and 10c.

The reduction gear mechanism 89 serves as, for example, a power transfer mechanism, and includes, for example, a first gear coupled to a first end of the rotational shaft 103 of the motor 10, and a second gear engaged with the first gear and mounted to the steering shaft 92. For example, the reduction gear mechanism 89 is operative to transfer the steering-assist torque generated based on the turning of the rotational shaft 103 of the motor 10 to the steering shaft 92 while reducing the rotational speed of the motor 10, i.e. increasing the assist torque generated by the motor 10 by a predetermined gear ratio between the first gear and the second gear.

The vehicle V include a vehicle velocity sensor 93 for measuring a velocity of the vehicle V as a vehicle velocity Vc.

The motor driving device 80 controls the steering-assist torque generated based on rotation of the motor 10. The motor driving device 80 receives information including the steering torque Ts detected by the torque sensor 94, the rate of turning Vs of the steering wheel 91 detected by the steering-angle sensor 95, and the vehicle velocity Vc measured by the vehicle velocity sensor 93. The motor driving device 80 controls rotation of the motor 10 based on the steering torque Ts, steering velocity Vs, and vehicle velocity Vc to correspondingly produce a request value of the steering-assist torque.

FIG. 2 shows the motor 10 and the motor driving device 80.

The motor driving device 80 includes an inverter 81, a current detection part 70, and a controller 60.

The inverter 81 supplies three-phase AC power to the motor 10. The current detection part 70 detects currents supplied from the inverter 81 of the inverter 81 to flow through the respective phase coils 10a, 10b, and 10c of the motor 10. The controller 60 controls how to drive the inverter 81. In the present embodiment, the inverter 81 corresponds to, for example, a power converter.

Specifically, in the vehicle V, a direct-current (DC) power source 81 is installed in the vehicle V, and DC power source 81 outputs DC power. The first embodiment uses a battery 81 as an example of such a DC power source.

The inverter 81 is connected to the battery 200 via a positive power line 14 and a negative power line (not shown), and also connected to the motor 10. The inverter 81 converts the DC power outputted from the battery 200 into three-phase AC power. The inverter 81 also supplies the three-phase AC power to the motor 10. In the present embodiment, the inverter 81 is designed as a full-bridge inverter comprised of a first set of U-phase upper- and lower-arm switching elements, a second set of V-phase upper- and lower-arm switching elements, and a third set of W-phase upper- and lower-arm switching elements; the upper- and lower-arm switching elements of each set are connected in series to each other. Each switching element of the inverter 81 is connected to the controller 60, so that each switching element is switched on or off in response to a drive signal outputted from the controller 60. For example, the first embodiment uses MOSFETS as the respective switching elements.

Each of the U-, V-. and W-phase coils 10a, 10b, and 10c has opposing first and second ends, and the battery 200 has opposing positive and negative terminals. Each switching element of the inverter 81 has first and second terminals that constitute a conductive channel therebetween. For example, the MOSFET used for each switching element has drain and source corresponding to the first and second terminals.

The first terminals of the U-. V-. and W-phase upper-arm switches of the inverter 81 are connected to the positive terminal of the battery 200 via the positive power line 14. The second terminals of the U-. V-. and W-phase lower-arm switches of the inverter 81 are connected to the negative terminal of the battery 200 via the negative power line.

The second terminal of the upper-arm switching element and the first terminal of the lower-arm switching element of each phase are connected to each other, so that the upper- and lower-arm switching elements are connected in series to each other. The connection point between the upper- and lower-arm switching elements of the U-phase is connected to the first end of the U-phase coil 10a via a U-phase power line, the connection point between the upper- and lower-arm switching elements of the V-phase is connected to the first end of the V-phase coil 10b via a V-phase power line, and the connection point between the upper- and lower-arm switching elements of the W-phase is connected to the first end of the W-phase coil 10c via a W-phase power line.

The second ends of the three-phase coils 10a, 10b, and 10c are commonly connected to each other in, for example, star-configuration; the common connection point serves as a neutral point.

The current detection part 70 includes a U-phase current detector 71 provided at the U-phase power line, a V-phase current detector 72 provided at the V-phase power line, and a W-phase current detector 73.

The U-phase current detector 71 detects a current supplied from the inverter 81 to flow through the U-phase coil 10a as an analog U-phase motor current Iu. The V-phase current detector 72 detects a current supplied from the inverter 81 to flow through the V-phase coil 10b as an analog V-phase motor current Iv. The W-phase detector 73 detects a current supplied from the inverter 81 to flow through the W-phase coil 10c as an analog W-phase motor current Iw.

The current detectors 71, 72, and 73 are configured to respectively output the detected U-, V-, and W-phase motor currents Iu, Iv, and Iw to the controller 60. Each of the phase current detectors 71 to 73 according to the first embodiment is for example comprised of a shunt resistor or alternatively a Hall effect sensor.

The motor driving device 80 for example includes a power supply relay 13 provided at the positive power line 14. The power supply relay 13 is for example connected to the controller 60, and is turned on or off under control of the controller 60 to allow the DC power to be supplied from the battery 200 to the inverter 81 or interrupt this power supply.

The motor driving device 80 for example includes a voltage detector 12 connected in parallel to the battery 200. That is, the voltage detector 12 has opposing first and second ends, the first end of the voltage detector 12 is connected to a portion of the positive power line 14 located between the power supply relay 13 and the positive terminal of the battery 200, and the second end of the voltage detector 12 is connected to a portion of the negative power line located between the inverter 81 and the negative terminal of the battery 200.

The voltage detector 12 detects an input voltage, i.e. an input DC voltage, Vin across the battery 200, which is input to the inverter 81. The voltage detector 12 is connected to the controller 60, so that the input voltage Vin is supplied from the voltage detector 12 to the controller 60.

Additionally, the motor driving device 80 for example includes a rotation angle sensor 11 provided in the motor 10. The rotation angle sensor 11 detects a rotation angle θ of the motor 10, i.e. the rotation angle θ of the rotor 102 of the motor 10. The rotation angle sensor 11 is connected to the controller 60, so that the rotation angle θ of the motor 10 is supplied from the rotation angle sensor 11 to the controller 60.

The rotation angle sensor 11 is comprised of, for example, a resolver. The rotation angle sensor 11 is capable of calculating an angular velocity ω of the motor 10 based on the rotation angle θ of the motor 10, and outputting the angular velocity ω of the motor 10 to the controller 60.

The controller 60 is for example comprised of mainly a known microcomputer including at least a CPU 60a, a memory unit 60b including a ROM and a RAM, an I/O interface 60c, and analog-to-digital (A/D) converters 69a, 69b, and 69c described later. The controller 60 includes various functions for controlling the inverter 81 to thereby drive the motor 10. Various programs for causing the CPU 60a of the controller 60 to perform the various functions, i.e. various routines, are stored in, for example, the ROM of the memory unit 60b. In addition, various data items usable by the CPU 60a of the controller 60 are also stored in, for example, the RAM of the memory unit 60b.

Note that at least part of all the functions provided by the controller 60 can be implemented by at least one processor; the at least one processor can be comprised of (1) The combination of at least one programmed processing unit, i.e. at least one programmed logic circuit, and at least one memory including software that causes the at least one programmed logic circuit to implement all the functions (2) At least one hardwired logic circuit that implements all the functions (3) At least one hardwired-logic and programmed-logic hybrid circuit that implements all the functions As described above, the controller 60 receives the steering torque Ts, rate of steering Vs, vehicle velocity Vc, and rotation angle θ from the respective torque sensor 94, steering-angle sensor 95, vehicle velocity sensor 93, and rotational angle sensor 11. On the basis of one or more of the steering torque Ts, rate of steering Vs, vehicle velocity Vc, and rotation angle θ, the controller 60 is configured to (1) Determine a request value for the steering-assist torque (2) Generate controlled drive signals for the respective switching elements of the inverter INV, which are required for the inverter 81 to cause the motor 10 to generate a value of the steering assist torque corresponding to the request value of the steering-assist torque (3) Apply the controlled drive signals to the respective switching elements of the inverter In particular, the controller 60 cyclically performs feedback control of d-axis and q-axis currents Id and Iq, which are obtained based on the three-phase motor currents Iu, Iv, and Iw described later, to respective d-axis and q-axis command current values Id* and Iq* using a duty cycle of each drive signal as a manipulated variable. Note that the drive signal for each switching element is comprised of a pulse signal with a controllable duty cycle, i.e. a controllable on-pulse width for each switching cycle. In other words, the controllable duty cycle of the drive signal for each switching element represents a predetermined ratio, i.e. percentage, of on duration to the total duration of each switching cycle for the corresponding switching element.

Specifically, as a function of implementing the feedback control, the controller 60 includes a three-phase to two-phase coordinate convertor 61, a limit variable calculator 62, a command value calculator 63, a current limiter 64, current deviation calculators 65a and 65b, proportional-integral (PI) controllers 66a and 66b, a two-phase to three-phase coordinate converter 67, a pulse-width modulation (PWM) controller 68, and A/D converters 69a, 69b, and 69c. Note that, in FIG. 2, the three-phase to two-phase coordinate converter 61 will be illustrated as "3 TO 2 CONVERTER 61", and the two-phase to three-phase coordinate converter 67 will be illustrated as "2 TO 3 CONVERTER 67".

As described above, the current detectors 71, 72, and 73 are configured to respectively output the detected U-, V-, and W-phase motor currents Iu, Iv, and Iw to the controller 60.

The A/D converters 69a, 69b, and 69c receives the analog three-phase motor currents Iu, Iv, and Iw outputted from the respective current detectors 71, 72, and 73, and respectively converts the three-phase motor currents Iu, Iv, and Iw into digital three-phase motor currents Iu, Iv, and Iw. Then, the A/D converters 69a, 69b, and 69c supply the digital three-phase motor currents Iu, Iv, and Iw to the three-phase to two-phase coordinate converter 61.

The three-phase to two-phase converter 61 converts the digital three-phase motor currents Iu, Iv, and Iw into a d-axis current Idr and a q-axis current Iqr in the d-q coordinate system as a function of the rotation angle θ of the motor 10. The d-q coordinate system is defined by a d-axis and a q-axis. The d-axis indicates a reactive current component, that is, an exciting current component, which is a current contributing to a magnetic flux of the rotating magnetic field. The q-axis indicates an active current component, that is, a torque current component, which is a current contributing to torque of the motor 10.

Based on the d-axis and q-axis currents Idr and Iqr and d-axis and q-axis duty cycles Dd and Dq described later, the limit variable calculator 62 calculates values of d-axis and q-axis limit variables LId and LIq for limiting the three-phase motor currents Iu, Iv, and Iw. In the present embodiment, the limit variable calculator 62 for example calculates values of the respective d-axis and q-axis limit variables LId and LIq based on a target current It indicative of a target value for each of inverter currents flowing through the respective U-, V-, and W-phase sets of upper- and lower-arm switching elements of the inverter 81. The target current It is determined based on, for example, the input voltage Vin supplied to the inverter 81 from the battery 200, and/or the temperature of the inverter 81.

The command value calculator 63 calculates a value of a d-axis command current Id* and a value of a q-axis command current Iq* based on the steering torque Ts, steering velocity Vs, and vehicle velocity Vc.

For example, the command value calculator 63 of the first embodiment includes map information M1 in data-table format, in mathematical expression format, and/or program format, which can be stored in, for example, the memory unit of the controller 60. The map information M1, which is stored in, for example, the memory unit 60b, includes a relationship between (1) Values of the steering torque Ts, steering velocity Vs, and vehicle velocity Vc
(2) Values of the d-axis command current Id*
(3) Values of the q-axis command current Iq*

That is, the command value calculator 63 is configured to
1. Refer to the map information M1
2. Extract a value of the d-axis command current Id* corresponding to a present value of each of the steering torque Ts, steering velocity Vs, and vehicle velocity Vc to accordingly calculate the extracted value as a value of the d-axis command current Id*
3. Extract a value of the q-axis command current Iq* corresponding to the present value of each of the steering torque Ts, steering velocity Vs, and vehicle velocity Vc to accordingly calculate the extracted value as a value of the q-axis command current Iq*

That is, the set of the extracted values of the d-axis and q-axis command currents Id* and Iq* represents a value of the request steering-assist torque, which the motor 10 is required to generate.

In particular, the relationship of the map information M1 is configured such that, the lower the steering torque Ts, steering velocity Vs, and vehicle velocity Vc, the greater the d-axis command current Id* and q-axis command current Iq*, resulting in the request value of the steering-assist torque becoming greater.

In the first embodiment, at least one of the value of the d-axis command current Id* and value of the q-axis command current Iq* corresponds to, for example, a command current for f a motor current.

The current limiter 64 for example includes a first determiner 64a, a second determiner 64b, and a limit processor 64c.

Specifically, the current limiter 64 determines whether to correct the values of the respective d-axis and q-axis command currents Id*, Iq* calculated by the command value calculator 63, based on the values of the respective d-axis and q-axis limit variable LId, LIq calculated by the limit variable calculator 62.

In the present embodiment, the current limiter 64 corrects a positive value of the d-axis command current Id* to the value of the d-axis limit variable LId if the positive value of the d-axis command current Id* is greater than the value of the d-axis limit variable LId. In contrast, the current limiter 64 outputs the positive value of the d-axis command current Id* without correcting it if the positive value of the d-axis command current Id* is less than or equal to the value of the d-axis limit variable LId.

The current limiter 64 corrects a negative value of the d-axis command current Id* to the value of the d-axis limit variable LId if the negative value of the d-axis command current Id* is less than the value of the d-axis limit variable LId. In contrast, the current limiter 64 outputs the negative value of the d-axis command current Id* without correcting it if the negative value of the d-axis command current Id* is greater than or equal to the value of the d-axis limit variable LId.

Similarly, the current limiter 64 corrects a positive value of the q-axis command current Iq* to the value of the q-axis limit variable LIq if the positive value of the q-axis command current Iq* is greater than the value of the q-axis limit variable LIq. In contrast, the current limiter 64 outputs the positive value of the q-axis command current Iq* without correcting it if the positive value of the q-axis command current Iq* is less than or equal to the value of the q-axis limit variable LIq.

The current limiter 64 corrects a negative value of the q-axis command current Iq* to the value of the q-axis limit variable LIq if the negative value of the q-axis command current Iq* is less than the value of the q-axis limit variable LIq. In contrast, the current limiter 64 outputs the negative value of the q-axis command current Iq* without correcting it if the negative value of the q-axis command current Iq* is greater than or equal to the value of the q-axis limit variable LIq.

In the following description, a value of the d-axis command current Id* or the value of the d-axis limit variable LId, which is outputted from the current limiter 64, will be referred to as a value of a d-axis command current Id**. Similarly, a value of the q-axis command current Iq* or the calculated variable of the q-axis limit variable LIq, which is outputted from the current limiter 64, will be referred to as a value of a q-axis command current Iq**.

That is, the d-axis command current Id** is any one of the value of the d-axis limit variable LId to which the d-axis command current Id* has been limited, and the d-axis command current Id* itself. Similarly, the q-axis command current Iq** is any one of the value of the q-axis limit variable LIq to which the q-axis command current Iq* has been limited, and the q-axis command current Iq* itself.

The current deviation calculator 65a calculates a q-axis deviation ΔIq which is a value obtained by subtracting the q-axis current Iqr from the value of the q-axis command current Iq. The current deviation calculator 65b calculates a d-axis deviation ΔId which is a value obtained by subtracting the d-axis current Idr from the value of the d-axis command current Id.

The PI controller 66a performs, as a known feedback control task, a proportional-integral (PI) feedback control task using the q-axis current deviation ΔIq as input data, and a proportional gain term and an integral gain term of a PI feedback control algorithm (PI algorithm). The PI control task calculates a value of the q-axis duty cycle Dq for setting a q-axis voltage Vq to be applied to the motor 10 such that the q-axis current deviation ΔIq converges to zero, thus causing the q-axis current Iq to follow the q-axis command current Iq**.

Similarly, the PI controller 66b performs, as a known feedback control task, the PI feedback control task using the d-axis current deviation ΔId as input data, and a proportional gain term and an integral gain term of the PI feedback control algorithm. The PI control task calculates a value of the d-axis duty cycle Dd for setting a d-axis voltage Vd to be applied to the motor 10 such that the d-axis current deviation ΔId converges to zero, thus causing the d-axis current Id to follow the d-axis command current Id**. Note that the feedback control task used by each of the PI controllers 66a and 66b is not limited to the PI feedback control task. Another feedback control task, such as a proportional-integral-derivative (PID) feedback control task can be used by each of the PI controllers 66a and 66b as the feedback control task.

The two-phase to three-phase coordinate converter 67 converts, as a function of the rotation angle θ of the motor 10, the d-axis and q-axis duty cycles Dd and Dq into a U-phase duty cycle Du for the drive signal for the U-phase, a V-phase duty cycle Dv for the drive signal for the V-phase, and a W-phase duty cycle Dw for the drive signal for the W-phase.

Then, the two-phase to three-phase coordinate converter 67 outputs the three-phase duty cycles Du, Dv, and Dw to the PWM controller 68.

The PWM controller 68 receives the three-phase duty cycles Du, Dv, and Dw. Then, the PWM controller 68 generates the drive signals, i.e. on-off PWM signals, for the respective three-phase upper-arm switching elements of the inverter 81 based on the respective three-phase duty cycles Du, Dv, and Dw. The PWM controller 68 also reverses the drive signal (on-off PWM signal) for each of the three-phase upper-arm switching elements of the inverter 81, thus generating the drive signal, i.e. on-off PWM signal, for the corresponding one of the three-phase lower-arm switching elements of the inverter 81.

Thereafter, the PWM controller 68 applies the PWM signals to the respective upper- and lower-arm switching elements of the inverter 81, thus performing on-of switching operations of the respective upper- and lower-arm switching elements. This converts the input voltage Vin supplied to the inverter 81 from the battery 200 into controlled three-phase AC voltages, thus applying the three-phase AC voltages to the respective three-phase coils 10a, 10b, and 10c of the motor 10. This causes the motor 10 to generate the steering assist torque that matches with the value of the request steering-assist torque, and apply the steering-assist toque to the steering shaft 92, thus assisting the driver's steering operation of the steering wheel 91.

In the first embodiment, the current deviation calculators 65a, 65b, PI controllers 66a, 66b, two-phase to three-phase coordinate converter 67, and PWM controller 68 serve as, for example, a driving controller.

Next, the following describes an example of the procedure of how the limit variable calculator 62 calculates a value of each of the d-axis limit variable LId and q-axis limit variable LIq.

First, the limit variable calculator 62 can calculate actual supply power Winv from the inverter 81 to the motor 10 from the following equation (1) based on the d-axis and q-axis currents Idr, Iqr, the d-axis and q-axis duty cycles Dd, Dq, and the input voltage Vin supplied from the battery 200 to the inverter 81:

$$Winv=(Dd/Kd \times Idr+Dq/Kq \times Iqr) \times Vin \qquad (1)$$

where each of Kd and Kq represents a value that satisfies the corresponding one of the following d-axis and q-axis voltage equations (1A) and (1B):

$$Vd=Dd/Kd \times Vin \qquad (1A)$$

$$Vq=Dq/Kq \times Vin \qquad (1B)$$

If the target current It of each inverter current flows in the inverter 81 based on the input voltage Vin from the battery 200, the limit variable calculator 62 calculates the supply power Winv in accordance with the following equation (2):

$$Winv=It \times Vin \qquad (2)$$

Note that the first embodiment uses the above equation (2) assuming that there is no loss in the electrical path from the battery 200 to the inverter 81.

The limit variable calculator 62 derives, from the above equations (1, 1A, 1B, and 2), the following equation (3):

$$It=Winv/Vin=(Dd/Kd \times Idr+Dq/Kq \times Iqr) \qquad (3)$$

The equation (3) shows that the d-axis current Idr, which is expressed by the following equation (4), can be regarded as a value of the d-axis limit variable LId therefor, and shows that the q-axis current Iqr, which is expressed by the following equation (5), can be regarded as a value of the q-axis limit variable LIq therefor:

$$LId=(It-Dq/Kq \times Iqr) \times Kd/Dd \qquad (4)$$

$$LIq=(It-Dd/Kd \times Idr) \times Kq/Dq \qquad (5)$$

As described later, the current limiter 64 limits the d-axis and q-axis command currents Id* and Iq* based on the values of the respective d-axis and q-axis limit variables LId, LIq calculated in accordance with the respective equations (4) and (5), thus limiting the three-phase motor currents Iu, Iv, and Iw. Note that if each of the d-axis and q-axis currents Idr, Iqr has a negative value, the target current It has a negative sign.

As described above, the controller 60 is configured to change the d-axis and q-axis command currents Id* and Iq* as the steering torque Ts changes. This may cause the followability, i.e. trackability or responsivity, of the three-phase motor currents Iu, Iv, and Iw with respect to change in the d-axis and q-axis command currents Id*, Iq* to have a relatively decreased state.

In particular, during high-speed steering where a value of the steering velocity Vs is greater than a predetermined threshold value, the rate of increase in each of the current command values Id*, Iq* becomes greater. This may cause the followability of the motor currents Iu, Iv, and Iw with respect to change in the d-axis and q-axis command currents Id*, Iq* to be likely to have a relatively decreased state. In addition, a relative decrease in the followability of the motor currents Iu, Iv, and Iw with respect to change in the d-axis and q-axis command currents Id*, Iq* may encourage a driver of the vehicle V to operate the steering wheel 91 to accordingly increase a value of the steering torque Ts. This may result in further relative decrease in the followability of the motor currents Iu, Iv, and Iw with respect to change in the d-axis and q-axis command currents Id*, Iq*.

A relative decrease in the followability, i.e. responsivity, of the motor currents Iu, Iv, and Iw with respect to change in the d-axis and q-axis command currents Id*, Iq* may cause actual values of the respective motor currents Iu, Iv, and Iw to excessively deviate from corresponding values determined by the respective d-axis and q-axis command currents Id*, Iq*. This excessive deviation may result in a bad situation where the d-axis and q-axis command currents Id* and Iq* has been limited even though the motor currents Iu, Iv, and Iw are not actually limited.

From this viewpoint, the current limiter 64 determines whether the motor currents Iu, Iv, and Iw are in a situation where the motor currents Iu, Iv, and Iw are less likely to respond to correction or change of the d-axis and q-axis command currents Id* and Iq*. This situation will also be referred to as a less-response situation.

That is, a relative decrease in the followability of the motor currents Iu, Iv, and Iw with respect to the d-axis and q-axis command currents Id and Iq may cause values of the d-axis and q-axis currents Idr and Iqr calculated based on actual values of the respective motor currents Iu, Iv, and Iw to excessively deviate from corresponding values of the d-axis and q-axis command currents Id and Iq. In this situation, the motor currents Iu, Iv, and Iw are expected to be less likely to respond to change in correction of the d-axis and q-axis command currents Id* and Iq*. That is, a situation where a value of each of the d-axis and q-axis currents Idr and Iqr calculated based on actual values of the respective motor currents Iu, Iv, and Iw excessively deviate from a corresponding value of the d-axis and q-axis command currents Id and Iq will be similarly referred to as a less-response situation.

The limit variable calculator 62 therefore determines whether the d-axis and q-axis currents Idr and Iqr excessively deviate from the respective d-axis and q-axis command currents Id and Iq to thereby determine whether the motor currents Iu, Iv, and Iw are in the less-response situation.

The current limiter 64 corrects, i.e. limits, the d-axis and q-axis command currents Id*, Iq* if the limit variable calculator 62 determines that the motor currents Iu, Iv, and Iw are in the less-response situation. Otherwise, the current limiter 64 holds the values of the d-axis and q-axis command currents Id*, Iq* unchanged if the limit variable calculator 62 determines that the motor currents Iu, Iv, and Iw are not in the less-response situation.

Figure 3:
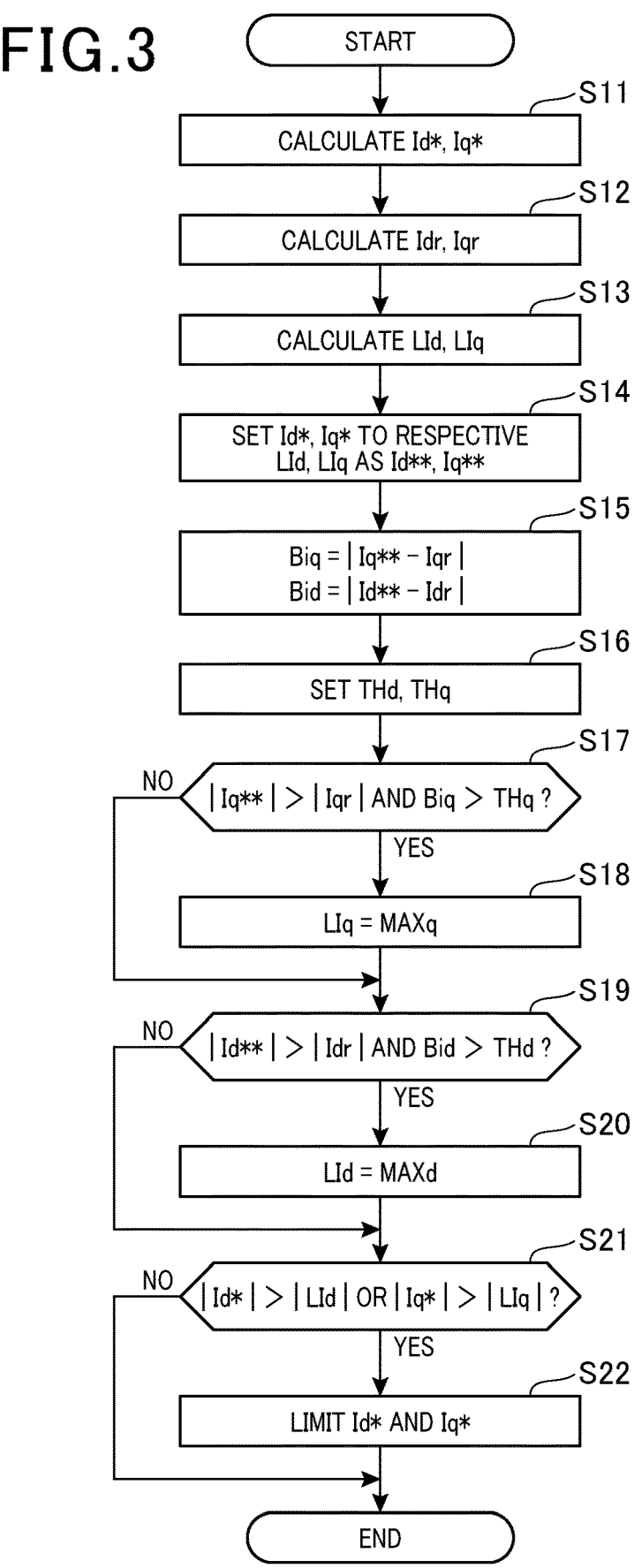
FIG. 3 is a flowchart schematically illustrating an example of the procedure of a limitation routine carried out by the motor driving device according to the first embodiment.

FIG. 3 is a flowchart schematically illustrating an example of the procedure of a limitation routine according to the first embodiment. The controller 60, i.e. the CPU 60a, of the motor driving device 80 is configured to periodically execute the limitation routine shown in FIG. 3. Each limitation routine periodically carried out by the controller 60 will be referred to as a cycle.

When performing a present cycle of the limitation routine, the command value calculator 63 converts the three-phase motor currents Iu, Iv, and Iw into the d-axis current Idr and the q-axis current Iqr as a function of the rotation angle θ of the motor 10.

At step S13, the limit variable calculator 62 calculates values, i.e. calculation values, of the respective d-axis and q-axis limit variables LId and LIq for the next cycle based on the d-axis and q-axis currents Idr and Iqr and d-axis and q-axis duty cycles Dd and Dq calculated in the present cycle. The limit variable calculator 62 of the first embodiment calculates values of the respective d-axis and q-axis limit variables LId and LIq for the next cycle in accordance with the above equations (4) and (5).

Next, the current limiter 64 performs a task of determining whether to correct the values of the respective d-axis and q-axis command currents Id*, Iq* calculated at step S11 based on the calculation values of the respective d-axis and q-axis limit variables LId, LIq calculated at step S13.

Specifically, the current limiter 64 sets, as each of the d-axis and q-axis command currents Id and Iq, each of the d-axis and q-axis command currents Id*, Iq* to the value of the corresponding one of the d-axis and q-axis limit variables LId, LIq at step S14.

At step S15, the current limiter 64 subtracts, from the q-axis command current Iq, the value of the q-axis current Iqr to thereby obtain a subtraction value, and calculates the absolute value of the subtraction value as a deviation amount Biq of the q-axis current Iqr with respect to the q-axis command current Iq. Similarly, the current limiter 64 subtracts, from the d-axis command current Id, the value of the d-axis current Idr to thereby obtain a subtraction value, and calculates the absolute value of the subtraction value as a deviation amount Bid of the d-axis current Idr with respect to the d-axis command current Id.

At step S16, the current limiter 64 sets threshold currents THd, THq. The threshold current THd is a value for determining whether the followability of the d-axis current Idr with respect to the d-axis command current Id has a relatively decreased state due to, for example, an excessive deviation of the d-axis current Idr from the d-axis command current Id. Similarly, the threshold current THq is a value for determining whether the followability of the q-axis current Iqr with respect to the q-axis command current Iq has a relatively decreased state due to, for example, an excessive deviation of the q-axis current Iqr from the q-axis command current Iq.

In particular, the rate of increase in each of the d-axis and q-axis command currents Id*, Iq* becoming greater causes the followability of the motor currents Iu, Iv, and Iw with respect to change in the d-axis and q-axis command currents Id*, Iq* to be more likely to have a relatively decreased state.

From this viewpoint, the current limiter 64 is configured to (1) Calculate the rate of increase Rd in the d-axis command current Id* and the rate of increase Rq in the q-axis command current command Iq*

(2) Increase the possibility of the motor currents Iu, Iv, and Iw being in the less-response situation with an increase in the calculated rate of increase Rd, Rq in at least one of the d-axis and q-axis command currents Id* and Iq*

As described above, the less-response situation represents the situation where the motor currents Iu, Iv, and Iw are less likely to respond to change in correction of the values of the d-axis and q-axis command currents Id* and Iq*.

Figure 4A:
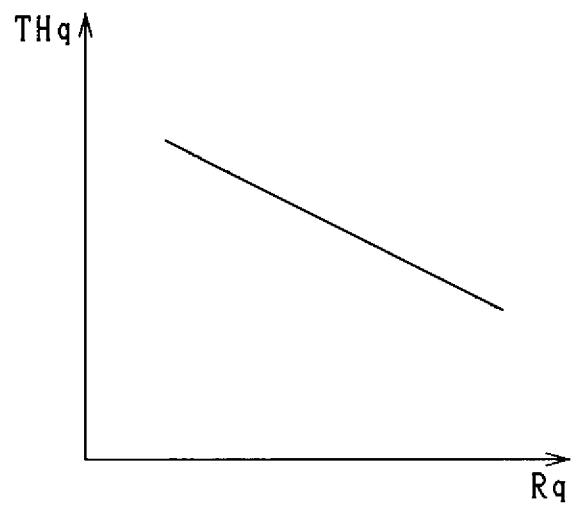
FIG. 4(a) is a graph schematically illustrating an example of the relationship between a rate of increase in a q-axis command current and a q-axis current threshold according to the first embodiment.

As illustrated in FIG. 4(a), the current limiter 64 of the first embodiment is configured to set the threshold current THq to a smaller value as the rate of increase Rq in the q-axis command current Iq* becomes higher. This enables the current limiter 64 of the controller 60 to determine more easily that the motor currents Iu, Iv, and Iw are in the less-response situation.

Figure 4B:
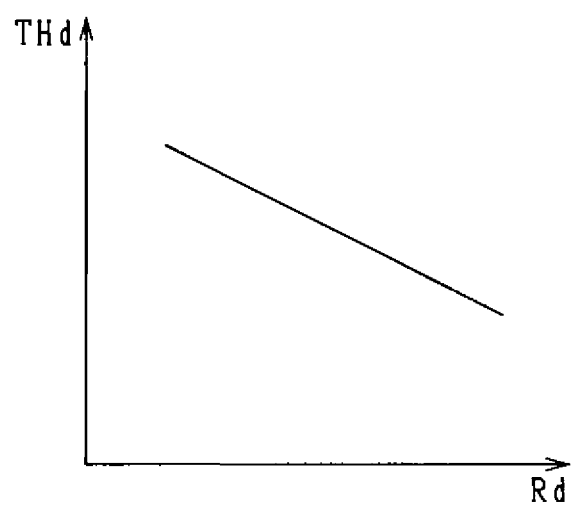
FIG. 4(b) is a graph schematically illustrating an example of the relationship between a rate of increase in a d-axis command current and a d-axis current threshold according to the first embodiment.

In addition, as illustrated in FIG. 4(b), the current limiter 64 of the first embodiment is configured to set the threshold current THd to a smaller value as the rate of increase Rd in the d-axis command current Id* becomes higher. This enables the current limiter 64 of the controller 60 to determine more easily that the motor currents Iu, Iv, and Iw are in the less-response situation.

Referring back to FIG. 3, the current limiter 64 of the controller 60 serves as, for example, the first determiner 64a to determine whether the followability of the q-axis current Iqr with respect to the q-axis command current Iq** has a relatively decreased state at step S17.

Specifically, the current limiter 64 of the controller 60 determines whether (1) The absolute value of the q-axis current Iqr is less than the absolute value of the q-axis command current Iq**

(2) The deviation amount Biq calculated at step S15 is larger than the current threshold THq For a case where both the q-axis current Iqr and q-axis command current Iq are positive, the current limiter 64 of the controller 60 determines that the q-axis current Iqr is excessively smaller than, i.e. excessively deviates from, the q-axis command current Iq to therefore determine that the followability of the q-axis current Iqr with respect to the q-axis command current Iq has a relatively decreased state upon (1) The q-axis current Iqr being less than the absolute value of the q-axis command current Iq

(2) The deviation amount Biq being larger than the current threshold THq

In addition, for a case where both the q-axis current Iqr and q-axis command current Iq are negative, the current limiter 64 of the controller 60 determines that the q-axis current Iqr is excessively larger than, i.e. excessively deviates from, the q-axis command current Iq to therefore determine that the followability of the q-axis current Iqr with respect to the q-axis command current Iq has a relatively decreased state upon (1) The q-axis current Iqr being more than the absolute value of the q-axis command current Iq

(2) The deviation amount Biq being larger than the current threshold THq

That is, the current limiter 64 of the controller 60 is configured to compare the absolute value of the q-axis current Iqr with the absolute value of the q-axis command current Iq** in addition to the determination of whether the deviation amount Biq is larger than the current threshold THq at step S17.

If it is determined that the q-axis current Iqr is not more than the absolute value of the q-axis command current Iq and/or the deviation amount Biq is equal to or smaller than the current threshold THq, so that it is determined that the followability of the q-axis current Iqr with respect to the q-axis command current Iq does not have a relatively decreased state (NO at step S17), the present cycle of the limitation routine proceeds to step S19.

Otherwise, if it is determined that the q-axis current Iqr is more than the absolute value of the q-axis command current Iq and the deviation amount Biq is larger than the current threshold THq, so that it is determined that the followability of the q-axis current Iqr with respect to the q-axis command current Iq has a relatively decreased state (YES at step S17), the present cycle of the limitation routine proceeds to step S18.

At step S18, the current limiter 64 sets the q-axis limit variable LIq to a predetermined q-axis maximum value MAXq. In the present embodiment, if the value of the q-axis limit variable LIq is positive, the q-axis maximum value MAXq is set to a value greater than or equal to a maximum value of the q-axis command current Iq*; if the value of the q-axis limit variable LIq is negative, the q-axis maximum value MAXq is set to a value less than or equal to a minimum value of the q-axis command current Iq*, so that the absolute value of the q-axis maximum value MAXq is larger than or equal to the absolute value of the minimum value of the q-axis command current Iq*. The q-axis maximum value MAXq may be set to a value greater than or equal to a maximum value of the q-axis current Iqr upon the value of the q-axis limit variable LIq being positive, or set to a value less than or equal to a minimum value of the q-axis current Iqr upon the value of the q-axis limit variable LIq being negative.

At step S19, the current limiter 64 of the controller 60 serves as, for example, the first determiner 60a to determine whether the followability of the d-axis current Idr with respect to the d-axis command current Id** has a relatively decreased state, which is similar to the determination at step S17.

Specifically, the current limiter 64 of the controller 60 determines whether (1) The absolute value of the d-axis current Idr is less than the absolute value of the d-axis command current Id**

(2) The deviation amount Bid calculated at step S15 is larger than the current threshold THd If it is determined that the d-axis current Idr is not more than the absolute value of the d-axis command current Id and/or the deviation amount Bid is equal to or smaller than the current threshold THd, so that it is determined that the followability of the d-axis current Idr with respect to the d-axis command current Id does not have a relatively decreased state (NO at step S19), the present cycle of the limitation routine proceeds to step S21.

Otherwise, if it is determined that the d-axis current Idr is more than the absolute value of the d-axis command current Id and the deviation amount Bid is larger than the current threshold THd, so that it is determined that the followability of the d-axis current Idr with respect to the d-axis command current Id has a relatively decreased state (YES at step S19), the present cycle of the limitation routine proceeds to step S20.

At step S20, the current limiter 64 sets the d-axis limit variable LId to a predetermined d-axis maximum value MAXd. In the present embodiment, if the value of the d-axis limit variable LId is positive, the d-axis maximum value MAXd is set to a value greater than or equal to a maximum value of the d-axis command current Id*; if the value of the d-axis limit variable LId is negative, the d-axis maximum value MAXd is set to a value less than or equal to a minimum value of the d-axis command current Id*, so that the absolute value of the d-axis maximum value MAXd is larger than or equal to the absolute value of the minimum value of the d-axis command current Id*. The d-axis maximum value MAXd may be set to a value greater than or equal to a maximum value of the q-axis current Iqr upon the value of the d-axis limit variable LId being positive, or set to a value less than or equal to a minimum value of the d-axis current Idr upon the value of the d-axis limit variable LId being negative.

A relative decrease in the followability of the d-axis and q-axis currents Idr, Iqr with respect to the d-axis and q-axis command currents Id, Iq may cause the polarity of each of the current command values Id, Iq to be different from the polarity of the corresponding one of the d-axis and q-axis currents Idr, Iqr.

From this viewpoint, the current limiter 64 can be configured to
(1) Calculate the product of the q-axis command current Iq** and the q-axis current Iqr
(2) Determine whether the product of the q-axis command current Iq** and the q-axis current Iqr is positive or negative
(3) Determine that the followability of the q-axis current Iqr with respect to the q-axis command current Iq has a relatively decreased state (YES at step S17) upon determining that the product of the q-axis command current Iq and the q-axis current Iqr is negative Similarly, the current limiter 64 can be configured to
(1) Calculate the product of the d-axis command current Id** and the d-axis current Idr
(2) Determine whether the product of the d-axis command current Id** and the d-axis current Idr is positive or negative
(3) Determine that the followability of the d-axis current Idr with respect to the d-axis command current Id has a relatively decreased state (YES at step S19) upon determining that the product of the d-axis command current Id and the d-axis current Idr is negative Following the operation at step S19 or S20, the current limiter 64 serves as, for example, the second determiner 64b to determine whether at least one of the absolute values of the respective d-axis and q-axis command currents Id* and Iq* calculated at step S11 is greater than at least one of the corresponding absolute values of the d-axis and q-axis limit variables LId and LIq at step S21.

That is, the determination of whether at least one of the absolute values of the respective d-axis and q-axis command currents Id* and Iq* is greater than at least one of the corresponding absolute values of the d-axis and q-axis limit variables LId and LIq at step S21 represents a determination of whether to correct the respective d-axis and q-axis command currents Id*, Iq* based on the values of the respective d-axis and q-axis limit variables LId, LIq.

When determining that at least one of the absolute values of the respective d-axis and q-axis command currents Id* and Iq* calculated at step S11 is greater than at least one of the corresponding absolute values of the d-axis and q-axis limit variables LId and LIq (YES at step S21), the current limiter 64 determines to correct the d-axis and q-axis command currents Id*, Iq* based on the values of the respective d-axis and q-axis limit variables LId, LIq. Then, the present cycle of the limitation routine proceeds to step S22.

Otherwise, when determining that none of the absolute values of the respective d-axis and q-axis command currents Id* and Iq* calculated at step S11 is greater than the corresponding one of the absolute values of the d-axis and q-axis limit variables LId and LIq (NO at step S21), the current limiter 64 determines not to correct the d-axis and q-axis command currents Id*, Iq* based on the values of the respective d-axis and q-axis limit variables LId, LIq. Then, the controller 60 terminates the present cycle of the limitation routine.

Following the determination of correcting the d-axis and q-axis command currents Id*, Iq* based on the values of the respective d-axis and q-axis limit variables LId, LIq, the current limiter 64 serves as, for example, the limit processor 64c to limit the command current Id* and command current Iq* to the values of the respective d-axis and q-axis limit variables LId and LIq at step S22. Then, the current limiter 64 outputs the values of the respective d-axis and q-axis limit values LId and LIq as the respective d-axis and q-axis command currents Id and Iq to the respective current deviation calculators 65a and 65b at step S22.

In particular, if the current limiter 64 carries out the operation at step S21 after having performed the operation at step S18 or step S20, the current limiter 64 determines not to correct the respective d-axis and q-axis command currents Id*, Iq* based on the maximum values MAXd and MAXq set to the respective d-axis and q-axis limit variables LId, LIq (NO at step S21). This is because setting of each of the d-axis and q-axis limit variables LId and LIq to the corresponding one of the d-axis and q-axis maximum values MAXd and MAXq at the corresponding one of steps S18 and S20 prevents the absolute value of each of the command currents Id*, Iq* from exceeding the absolute value of the corresponding one of the d-axis and q-axis limit variables LId and LIq.

After the negative determination at step S21, the controller 60 terminates the present cycle of the limitation routine without limiting the d-axis and q-axis command currents Id* and Iq*, so that the current limiter 64 outputs the d-axis and q-axis command currents Id* and Iq* as they are as the respective d-axis and q-axis command currents Id and Iq to the respective current deviation calculators 65a and 65b.

That is, the operations at steps S18 and S20 to S22 correspond to, for example, a current limiter.

The first embodiment described above produces the following effects.

The motor driving device 80 is configured to determine whether to correct values of the respective d-axis and q-axis command currents Id* and Iq* based on a correlation between the d-axis and q-axis command currents Id* and Iq* and the respective d-axis and q-axis currents Idr and Iqr.

Specifically, the controller 60 determines whether the motor currents Iu, Iv, and Iw are in the less-response situation where they are less likely to respond to correction of the values of the d-axis and q-axis command currents Id* and Iq*. Then, the controller 60 determines whether to correct the d-axis and q-axis command currents Id* and Iq* based on a result of the determination of whether the motor currents Iu, Iv, and Iw are in the less-response situation.

The controller 60 corrects the d-axis and q-axis command currents Id* and Iq* upon determining that the motor currents Iu, Iv, and Iw are in the less-response situation, and keeps the d-axis and q-axis command currents Id* and Iq* unchanged upon determining that the motor currents Iu, Iv, and Iw are not in the less-response situation.

This configuration of the controller 60 allows the d-axis and q-axis command currents Id*, Iq* to be appropriately limited based on whether the followability of the motor currents Iu, Iv, and Iw with respect to changes in the d-axis and q-axis command currents Id*, Iq* has a relatively decreased state.

The controller 60 determines whether the motor currents Iu, Iv, and Iw are in the less-response situation based on the deviation amounts Bid and Biq of the d-axis and q-axis currents Idr and Iqr with respect to the respective command currents Id and Iq. This configuration makes it easier to determine whether the motor currents Iu, Iv, and Iw are in the less-response situation.

The rate of increase in each of the current command values Id*, Iq* becoming greater causes the followability of the motor currents Iu, Iv, and Iw with respect to change in the d-axis and q-axis command currents Id*, Iq* to be more likely to have a relatively decreased state.

For addressing this point, the controller 60 is configured to determine more easily that the motor currents Iu, Iv, and Iw are in the less-response situation as the rate of increase Rq in the q-axis command current Iq* becomes higher.

This configuration makes it difficult for the controller 60 to limit the d-axis and q-axis command currents Id* and Iq* if it is determined that the followability of the motor currents Iu, Iv, and Iw with respect to changes in the d-axis and q-axis command currents Id*, Iq* is likely to have a relatively decreased state. This enables the d-axis and q-axis command currents Id*, Iq* to be more appropriately limited.

Modifications of First Embodiment

An increase in the rate of change in the amount of driver's steering of the steering wheel 41 may cause the followability of the motor currents Iu, Iv, and Iw with respect to change in the d-axis and q-axis command currents Id*, Iq* to have a relatively decreased state.

For addressing this point, the controller 60 can be configured to determine more easily that the motor currents Iu, Iv, and Iw are in the less-response situation as the rate of change in the amount of driver's steering of the steering wheel 41 becomes higher. Similarly, the controller 60 can be configured to determine more easily that the motor currents Iu, Iv, and Iw are in the less-response situation as the rate of change in the angular velocity ω of the motor 10, that is, the angular acceleration of the motor 10, becomes higher.

For example, the controller 60 according to this modification can calculate, at step S16, the rate of change in the amount of driver's steering of the steering wheel 41 based on a derivative value of the steering velocity Vs, and set each of the current thresholds THd, THq to a smaller value as the rate of change in the amount of driver's steering of the steering wheel 41 becomes higher.

Similarly, the controller 60 according to this modification can calculate, at step S16, the angular acceleration of the motor 10, and set each of the current thresholds THd, THq to a smaller value as the angular acceleration of the motor 10 becomes higher.

The controller 60 can be configured to change the possibility of the motor currents Iu, Iv, and Iw being in the less-response situation in accordance with at least one of (1) The rate of increase in each of the command currents Id*, Iq*
(2) The angular velocity ω of the motor 10
(3) The angular acceleration of the motor 10
(4) The combination of these parameters The controller 60 can be configured to determine whether the motor currents Iu, Iv, and Iw are in the less-response situation based on the deviation amount Biq of the q-axis current Iqr with respect to the q-axis command current Iq without using the deviation amount Bid of the d-axis current Idr with respect to the d-axis command current Id. This is because the q-axis current Iqr contributes more greatly to the steering assist torque than the d-axis current Idr.

The controller 60 of this modification can perform the operations at steps S18 and S20 after making positive determination at step S17 while skipping the operation at step S19.

Second Embodiment

Figure 5:
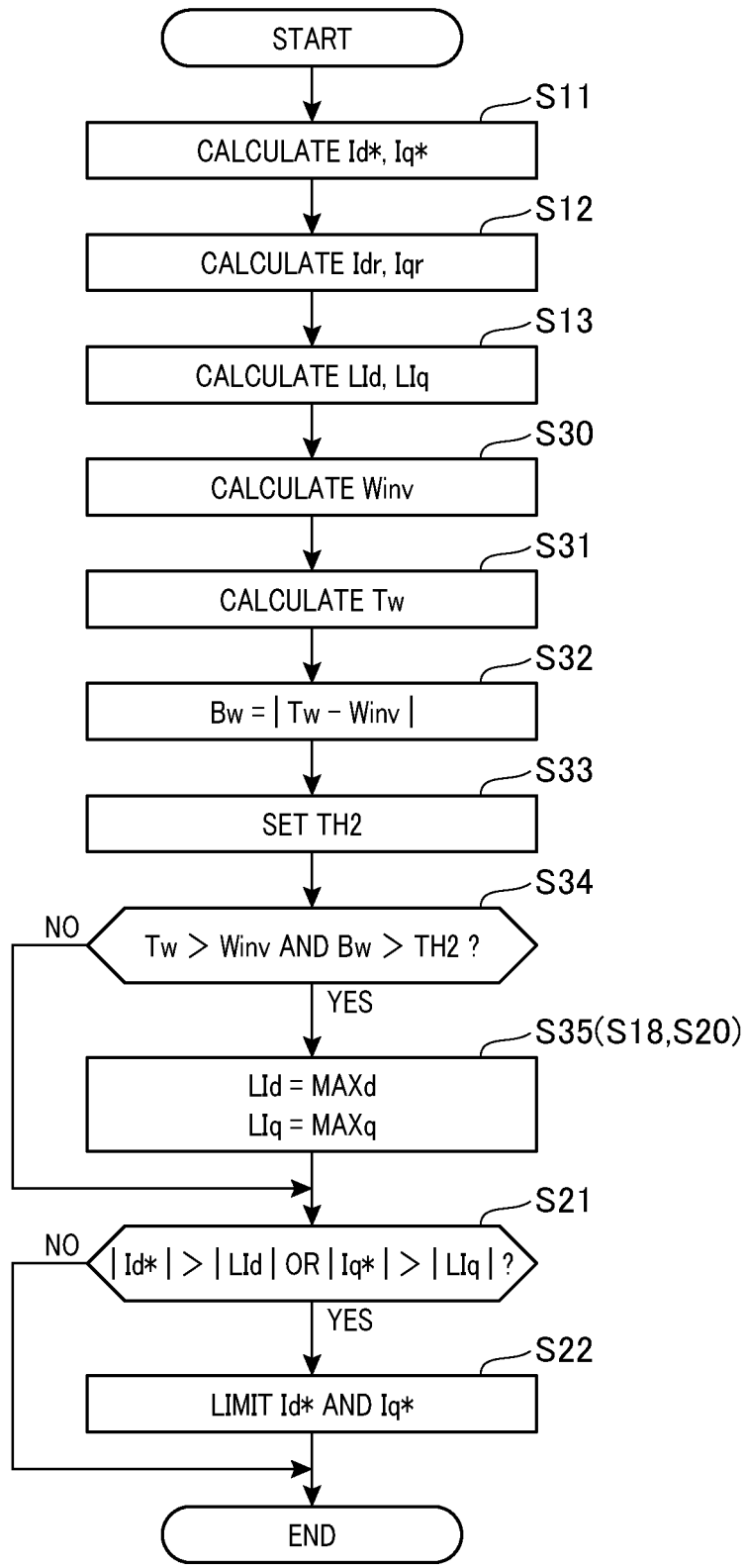
FIG. 5 is a flowchart schematically illustrating an example of the procedure of a limitation routine carried out by a motor driving device according to the second embodiment of the present disclosure.

The following describes an example of the configuration of a motor driving device according to the second embodiment of the present disclosure with reference to FIG. 5. The structure and/or functions of the motor driving device according to the second embodiment are mainly identical to those of the motor driving device 80 except for the following points. So, the following describes mainly the different points.

The controller 60 of the second embodiment is configured to determine whether the motor currents Iu, Iv, and Iw are in the less-response situation in response to limitation of the d-axis and q-axis command currents Id* and Iq* based on a shortage Bw of the actual supply power Winv from the inverter 81 to the motor 10 relative to target power Tw of the inverter 81

FIG. 5 is a flowchart schematically illustrating an example of the procedure of a limitation routine according to the second embodiment. The controller 60, i.e. the CPU 60a, of the motor driving device 80 is configured to periodically execute the limitation routine shown in FIG. 5. Like steps between the limitation routine illustrated in FIG. 3 and the limitation routine illustrated in FIG. 5, to which like step numbers are assigned, are omitted or simplified in description.

After calculating the calculation values of the respective d-axis and q-axis limit variables LId, LIq at step S13, the current limiter 64 serves as, for example, a supply power calculator 64d to calculate the actual supply power Winv of the inverter 81 at step S30. For example, the current limiter 64 calculates the actual supply power Winv of the inverter 81 in accordance with the equation (1).

Next, the current limiter 64 serves as, for example, a target power calculator 64e to calculate a value of the target power Tw indicative of a target value of power supplied from the inverter 81 based on the d-axis and q-axis command currents Id*, Iq* at step S31. For example, the current limiter 64 of the second embodiment calculates the value of the target power Tw in accordance with the following equation (6) using the d-axis and q-axis command currents Id*, Iq*, the axis duty cycles Dd, Dq, and the input voltage Vin:

$$Tw=(Dd/Kd\times|Id^*|+Dq/Kq\times|Iq^*|)\times Vin \qquad (6)$$

At step S32, the current limiter 64 subtracts, from the target power Tw, the actual supply power Winv to thereby obtain a subtraction value, and calculates the absolute value of the subtraction value as the shortage Bw of the actual supply power Winv relative to the target current Tw, that is, as the amount of the actual supply power Winv being below the target current Tw.

At step S33, the current limiter 64 sets threshold power TH2 used for determining whether the motor currents Iu, Iv, and Iw are in the less-response situation. The threshold power TH2 of the second embodiment is defined as power for determining that the followability of the respective axis currents Idr, Iqr with respect to the d-axis and q-axis command currents Id, Iq has a relatively decreased state if the actual supply power Winv is excessively below the target power Tw.

Like the first embodiment, the current limiter 64 of the second embodiment is configured to set the threshold power TH2 to a larger value as the rate of increase Rq in the q-axis command current Iq* becomes lower. This enables the current limiter 64 of the controller 60 to determine more easily that the motor currents Iu, Iv, and Iw are not in the less-response situation.

Following the operation at step S33, the current limiter 64 determines whether the followability of the d-axis and q-axis currents Idr and Iqr with respect to the respective d-axis and q-axis command currents Id and Iq has a relatively decreased state based on the actual supply power Winv and the shortage Bw of the actual supply power Winv relative to the target power Tw is higher than the threshold power TH2 at step S34.

Specifically, the current limiter 64 determines that the followability of the d-axis and q-axis currents Idr and Iqr with respect to the respective d-axis and q-axis command currents Id and Iq has a relatively decreased state (YES at step S34) upon (1) The actual supply power Winv being less than the target power Tw (2) The shortage Bw of the actual supply power Winv relative to the target power Tw being higher than the threshold power TH2

Upon determining that the followability of the d-axis and q-axis currents Idr and Iqr with respect to the respective d-axis and q-axis command currents Id and Iq has a relatively decreased state (YES at step S34), the current limiter 64 determines that the motor currents Iu. Iv, and Iw are in the less-response situation.

Then, the current limiter 64 sets each of the d-axis and the q-axis limit variables LId and LIq to the corresponding one of the d-axis and q-axis maximum values MAXd and MAXq at step S35.

Otherwise, the current limiter 64 determines that the followability of the d-axis and q-axis currents Idr and Iqr with respect to the respective d-axis and q-axis command currents Id and Iq does not have a relatively decreased state (NO at step S34) upon either (1) The actual supply power Winv being equal to or more than the target power Tw or (2) The shortage Bw of the actual supply power Winv relative to the target power Tw being equal to or lower than the threshold power TH2

Upon determining that the followability of the d-axis and q-axis currents Idr and Iqr with respect to the respective d-axis and q-axis command currents Id and Iq does not have a relatively decreased state (NO at step S34), the current limiter 64 determines that the motor currents Iu. Iv, and Iw are not in the less-response situation.

Then, the limitation routine proceeds to step S21 while skipping the operation at step S35. In other words, the command current limitation routine proceeds to step S21 without change of the d-axis and q-axis limit variables LId and LIq.

The current limiter 64 performs the operations at steps S21 and S22 according to the second embodiment in the same manner as the operations at steps S21 and S22 according to the first embodiment, and thereafter terminates the limitation routine.

That is, the command current limiter 64 limits the d-axis and q-axis command currents Id*, Iq* to the values of the respective d-axis and q-axis limit variables LId, LIq upon determining that at least one of the absolute values of the respective d-axis and q-axis command currents Id* and Iq* calculated at step S11 is greater than at least one of the corresponding absolute values of the respective d-axis and q-axis limit variables LId and LIq (YES at step S21 and step S22).

Otherwise, the command current limiter keeps the d-axis and q-axis command currents Id*, Iq* unchanged upon determining that none of the absolute values of the respective d-axis and q-axis command currents Id* and Iq* calculated at step S11 is greater than the corresponding one of the absolute values of the d-axis and q-axis limit variables LId and LIq (NO at step S21).

As described above, the controller 60 of the second embodiment is configured to calculate the actual supply power Winv from the inverter 81 to the motor 10 based on the motor currents Iu, Iv, and Iw, and calculate the target power Tw of the inverter 81 based on the d-axis and q-axis command currents Id*, Iq*.

Then, the controller 60 is configured to determine that the motor currents Iu, Iv, and Iw are in the less-response situation upon determining the shortage Bw of the actual supply power Winv relative to the target power Tw of the inverter 81 is larger than the predetermined threshold power TH2.

This configuration therefore allows the controller 60 to easily determine, based on the shortage Bw of the actual supply power Winv relative to the target power Tw of the inverter 81, whether the motor currents Iu, Iv, and Iw are in the less-response situation in response to limitation of the d-axis and q-axis command currents Id* and Iq*.

Third Embodiment

Figure 6:
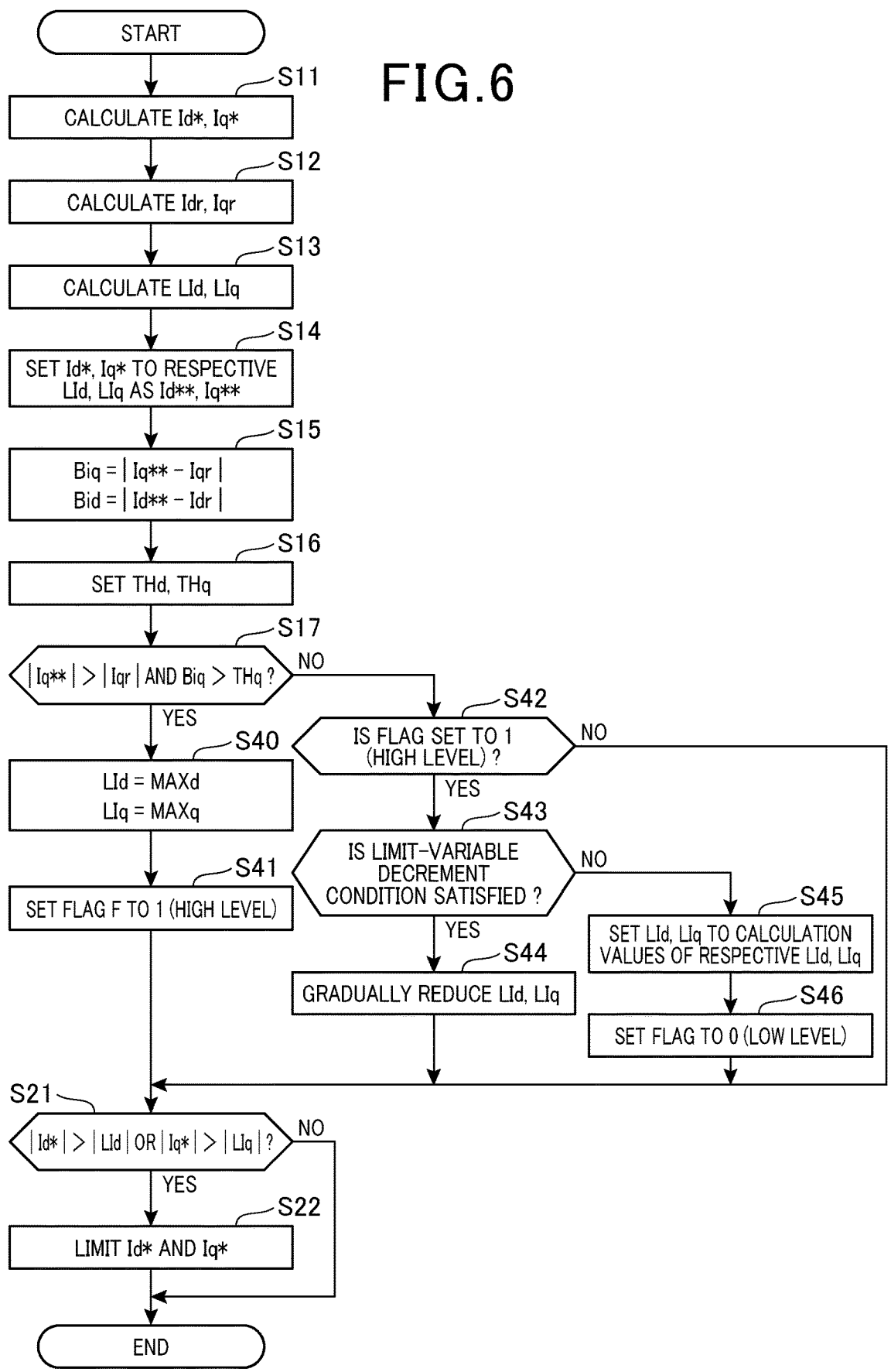
FIG. 6 is a flowchart schematically illustrating an example of the procedure of a limitation routine carried out by a motor driving device according to the third embodiment of the present disclosure.

The following describes an example of the configuration of a motor driving device according to the third embodiment of the present disclosure with reference to FIG. 6. The structure and/or functions of the motor driving device according to the third embodiment are mainly identical to those of the motor driving device 80 except for the following points. So, the following describes mainly the different points.

Let us consider a case where the motor currents Iu, Iv, and Iw, which have been in the less-response situation, is returned to a normal-response situation when the followability of the motor currents Iu, Iv, and Iw with respect to the d-axis and q-axis command currents Id and Iq have been improved; the normal-response situation represents a situation that the motor currents Iu, Iv, and Iw are likely to respond to correction of the d-axis and q-axis command currents Id* and Iq*.

In this case, a great limitation of the d-axis and q-axis command currents Id* and Iq* based on the values of the respective d-axis and q-axis limit variables LId and LIq may cause limited values of the d-axis and q-axis command currents Id* and Iq* to change greatly relative to non-limited values of the d-axis and q-axis command currents Id* and Iq* This may adversely affect operations of the motor 10.

From this viewpoint, the controller 60 of the third embodiment is configured to (1) Determine whether the motor currents Iu, Iv, and Iw, which have been in the less-response situation, is returned to the normal-response situation (2) Select one of the value of the d-axis current Idr and the calculation value of the d-axis limit variable LId such that the absolute value of the selected one of the value of the d-axis current Idr and the calculation value of the d-axis limit variable LId is larger than the absolute value of the other thereof upon determining that the motor currents Iu, Iv, and Iw, which have been in the less-response situation, is returned to the normal-response situation (3) Select one of the value of the q-axis current Iqr and the calculation value of the q-axis limit variable LIq such that the absolute value of the selected one of the value of the q-axis current Iqr and the calculation value of the q-axis limit variable LIq is larger than the absolute value of the other thereof upon determining that the motor currents Iu, Iv, and Iw, which have been in the less-response situation, is returned to the normal-response situation (4) Set the d-axis limit variable LId to the selected one of the value of the d-axis current Idr and the calculation value of the d-axis limit variable LId as an initial value (5) Set the q-axis limit variable LIq to the selected one of the value of the q-axis current Iqr and the calculation value of the q-axis limit variable LIq as an initial value FIG. 6 is a flowchart schematically illustrating an example of the procedure of a limitation routine according to the third embodiment. The controller 60, i.e. the CPU 60a, of the motor driving device 80 is configured to periodically execute the limitation routine shown in FIG. 6. Like steps between the limitation routine illustrated in FIG. 3 and the limitation routine illustrated in FIG. 6, to which like step numbers are assigned, are omitted or simplified in description.

As described above, the current limiter 64 of the controller 60 determines whether the motor currents Iu, Iv, and Iw are in the less-response situation in accordance with the deviation amount Biq of the q-axis current Iqr, which contributes greatly to the steering assist torque, with respect to the q-axis command current Iq** at step S17.

If determining that the motor currents Iu, Iv, and Iw are in the less-response situation (YES at step S17), the current limiter 64 sets each of the d-axis and the q-axis limit variables LId and LIq to the corresponding one of the d-axis and q-axis maximum values MAXd and MAXq at step S40. Subsequently, the current limiter 64 sets or holds a previously prepared non-limitation flag F to a logical high level, i.e. 1 at step S41.

Note that the non-limitation flag F is, for example, a bit having a logical high level, represented by 1, or a logical low level, represented by 0, and the initial value of the non-limitation flag F is set to 0. In particular, the non-limitation flag F, to which 1 is set, indicates that the d-axis and q-axis limit variables LId and LIq haven been respectively changed to the d-axis and q-axis maximum values MAXd and MAXq, so that the limitation operation at step S22 is not executed.

That is, following the operation at step S41, the current limiter 64 determines whether at least one of the absolute values of the respective d-axis and q-axis command currents Id* and Iq* calculated at step S11 is greater than at least one of the corresponding absolute values of the d-axis and q-axis limit variables LId and LIq at step S21. Because the d-axis and q-axis limit variables LId and LIq are respectively set to the d-axis and q-axis limitation maximum values MAXd and MAXq, the determination at step S21 is negative, so that the current limiter 64 terminates the present cycle of the limitation routine while skipping the operation at step S22.

The current limiter 64 executes the cycle of the limitation routine one or more times to thereby execute the operations at steps S17, S40, S41, and S21 in each cycle of the limitation routine while the determination at step S17 of the corresponding cycle of the limitation routine is positive (YES at step S17).

That is, if determining that the motor currents Iu, Iv, and Iw are not in the less-response situation (NO at step S17) in a present cycle of the one or more cycles of the limitation routine, the current limiter 64 determines whether the non-limitation flag F is set to 1 at step S42.

If determining that the non-limitation flag F is set to 1 (YES at step S42), the current limiter 64 determines whether at least one at least one limit-variable decrement condition for gradually decreasing, i.e. decrementing, the absolute set value of each of the d-axis and q-axis limit variables LId and LIq is satisfied at step S43.

For example, the current limiter 64 determines, at step S43, whether (1) The set value of the d-axis limit variable LId is larger than the value of the d-axis current Idr calculated at step S12

(2) The set value of the q-axis limit variable LIq is larger than the value of the q-axis current Iqr calculated at step S12

Upon determining that both the set value of the d-axis limit variable LId and the set value of the q-axis limit variable LIq are respectively larger than the values of the d-axis and q-axis currents Idr and Iqr calculated at step S12, the current limiter 64 determines that the at least one limit-variable decrement condition is satisfied (YES at step S43).

Otherwise, if determining that the non-limitation flag F is set to 0 (NO at step S42), the current limiter 64 terminates the present cycle of the limitation routine.

Following the affirmative determination at step S43, the current limiter 64 sets, as an initial value, the d-axis limit variable LId to a selected one of the value of the d-axis current Idr calculated at step S12 of the present cycle of the limitation routine and the calculation value of the d-axis limit variable LId calculated at step S13 of the present cycle of the limitation routine at step S44.

How the current limiter 64 selects one of the value of the d-axis current Idr and the calculation value of the d-axis limit variable LId is to select one of the value of the d-axis current Idr and the calculation value of the d-axis limit variable LId; the absolute value, i.e. the modulus, of the selected one of the value of the d-axis current Idr and the calculation value of the d-axis limit variable LId is larger than the absolute value of the other thereof.

Similarly, the current limiter 64 sets, as an initial value, the q-axis limit variable LIq to a selected one of the value of the q-axis current Iqr calculated at step S12 of the present cycle of the limitation routine and the calculation value of the q-axis limit variable LIq calculated at step S13 of the present cycle of the limitation routine at step S44.

How the current limiter 64 selects one of the value of the q-axis current Iqr and the calculation value of the q-axis limit variable LIq is to select one of the value of the q-axis current Iqr and the calculation value of the q-axis limit variable LIq; the absolute value, i.e. the modulus, of the selected one of the value of the q-axis current Iqr and the calculation value of the q-axis limit variable LIq is larger than the absolute value of the other thereof.

After the initial setting of each of the d- and q-axis axis limit variables LId and LIq, the current limiter 64 changes the set value of each of the B- and q-axis limit variables LId and LIq such that an absolute value of the set value of each of the d- and q-axis limit variables LId and LIq gradually decreases at step S44.

That is, the current limiter 64 executes the cycle of the limitation routine one or more times to thereby execute the operation at step S44 in each cycle of the limitation routine while (1) The determination at step S17 of the corresponding cycle of the limitation routine is positive (YES at step S17)

(2) The determination at each of steps S42 and S43 of the corresponding cycle of the limitation routine is positive (YES at each of steps S42 and S43)

This gradually changes the set value of each of the d-axis and q-axis limit variables LId and LIq each time the operation at step S44 is carried out.

For example, the current limiter 64 of the third embodiment is configured to change, by a variable quantity, the set value of each of the d-axis and q-axis limit variables LId and LIq each time of executing the operation at step S44 of the cycle of the limitation routine while changing the variable quantity for each execution of the operation at step S44. This results in the set value of each of the d-axis and q-axis limit variables LId and LIq approaching the calculation value of the corresponding one of the d-axis and q-axis limit variables LId and LIq calculated at step S13 of the corresponding cycle of the limitation routine.

For example, the current limiter 64 can be configured to change, using a known low-pass filter (LPF), the set value of each of the d-axis and q-axis limit variables LId and LIq by a variable quantity each time of executing the operation at step S44 of the cycle of the limitation routine using a known low-pass filter (LPF).

Following the operation at step S44, the current limiter 64 determines whether at least one of the absolute values of the respective d-axis and q-axis command currents Id* and Iq* calculated at step S11 is greater than at least one of the corresponding absolute values of the d-axis and q-axis limit variables LId and LIq at step S21 set forth above. That is, the current limiter 64 limits the command current Id* and command current Iq* to the values of the respective d-axis and q-axis limit variables LId and LIq upon determining to correct the d-axis and q-axis command currents Id*, Iq* (YES at step S21).

As a result of execution of at least one cycle of the limitation routine after initial setting of each of the d-axis and q-axis limit variables LId and LIq at step S44, when the absolute value of each of the d-axis and q-axis limit variables LId and LIq becomes equal to or smaller than the absolute calculation value of the corresponding one of the d-axis and q-axis limit variables LId and LIq calculated at step S13 in a present cycle of the one or more cycles of the limitation routine, the current limiter 64 determines that the at least one limit-variable decrement condition is unsatisfied (NO at step S43).

Then, the current limiter 64 sets each of the d-axis and q-axis limit variables LId and LIq to the calculation value of the corresponding one of the d-axis and q-axis limit variables LId and LIq calculated at step S13 in the present cycle of the limitation routine at step S45. Next, the current limiter 64 changes the non-limitation flag F from the logical high level, i.e. 1, to the logical low level, i.e. 0 at step S46.

Following the operation at step S46, the current limiter 64 determines whether at least one of the absolute values of the respective d-axis and q-axis command currents Id* and Iq* calculated at step S11 is greater than at least one of the corresponding absolute values of the d-axis and q-axis limit variables LId and LIq at step S21 set forth above.

The third embodiment described above produces the following effects.

The controller 60 of the third embodiment is configured to determine whether the motor currents Iu, Iv, and Iw, which have been in the less-response situation, is returned to the normal-response situation. Upon determining that the motor currents Iu, Iv, and Iw, which have been in the less-response situation, is returned to the normal-response situation, the controller 60 is configured to select (1) One of the value of the d-axis current Idr and the calculation value of the d-axis limit variable LId, which are calculated at a present cycle of the limitation routine, such that the absolute value of the selected one of the value of the d-axis current Idr and the calculation value of the d-axis limit variable LId is larger than the absolute value of the other thereof (2) One of the value of the q-axis current Iqr and the calculation value of the q-axis limit variable LIq, which are calculated at the present cycle of the limitation routine, such that the absolute value of the selected one of the value of the q-axis current Iqr and the calculation value of the q-axis limit variable LIq is larger than the absolute value of the other thereof After the selection operation, the controller 60 is configured to set (1) The d-axis limit variable LId to the selected one of the value of the d-axis current Idr and the calculation value of the d-axis limit variable LId as an initial value (2) The q-axis limit variable LIq to the selected one of the value of the q-axis current Iqr and the calculation value of the q-axis limit variable LIq as an initial value This configuration prevents the d-axis and q-axis command currents Id* and Iq* from being significantly changed even if the calculation values of the d-axis and q-axis limit variables LId and LIq are separated from the values of the respective d-axis and q-axis command currents Id* and Iq*, thereby preventing adverse effects on the operations of the motor 10.

Additionally, after the above initially setting operation, the controller 60 is configured to change the set value of each of the d-axis and q-axis limit variables LId and LIq to thereby gradually reduce the absolute set value of each of the d-axis and q-axis limit variables LId and LIq. This configuration appropriately limits the motor currents Iu, Iv, and Iw supplied to flow in the motor 10 while preventing the d-axis and q-axis command currents Id* and Iq* from being significantly changed.

Modification of Third Embodiment

The controller 60, i.e. the current limiter 64, of the third embodiment can be configured to individually determine whether the motor currents Iu, Iv, and Iw are in the less-response situation for each of the d-axis and q-axis currents Idr and the q-axis current Iqr at step S17.

In this modification, the controller 60, i.e. the current limiter 64, can be configured to individually perform the operations in steps S42 to S45 for each of the d-axis and q-axis currents Idr and Iqr.

Other Modifications

As described above, the controller 60 of each embodiment is configured to limit the d-axis and q-axis command currents Id* and Iq* when determining that the motor currents Iu, Iv, and Iw are in the less-response situation. This limitation results in the motor currents Iu, Iv, and Iw being likely to be limited.

From this viewpoint, the controller 60 according to a first modification can be configured to store, in the memory unit 60b, history information indicating that the d-axis and q-axis command currents Id* and Iq* have been limited or will be limited.

In this first modification, the controller 60 of this modification can include a storing processor 100 that stores, when determining that the motor currents Iu, Iv, and Iw are in the less-response situation as a negative determination at step S17 or S19, or having performed the operation at step S22, history information, which indicates that the d-axis and q-axis command currents Id* and Iq* will be limited or have been limited, in the memory unit 60b.

As described above, the controller 60 of the first embodiment is configured to set each of the d-axis and q-axis limit variables LId and LIq to a corresponding one of predetermined d-axis and q-axis maximum values MAXd and MAXq to thereby prevent limitation of the d-axis and q-axis command currents Id* and Iq*, that is, skipping the operation in step S22.

On the basis of this configuration, the controller 60 according to a second modification can be configured to perform, based on the steering torque Ts detected by the torque sensor 94, a compensation task of compensating for each of the d-axis and q-axis command currents Id* and Iq*, such as a compensating task of compensating for a phase of each of the d-axis and q-axis command currents Id* and Iq*, to thereby cause the steering system 90 to be stable.

However, when performing limitation of the d-axis and q-axis command currents Id* and Iq*, that is, performing the operation in step S22, because the motor currents Iu, Iv, and Iw are determined not to be in the less-response situation, the controller 60 can be configured not to perform the compensation task.

On the other hand, when performing the compensation task, because the motor currents Iu, Iv, and Iw are determined to be in the less-response situation, the controller 60 can be configured change the compensation task to a modified compensation task to thereby adjust the value of each of the d-axis and q-axis command currents. This adjustment causes the controller 60 to determine the determination in step S21 being negative to thereby skip the operation in step S22. This therefore can prevent limitation of the d-axis and q-axis command currents Id and Iq.

This configuration of the second modification prevents the controllability of the motor 10 from deteriorating when values of the motor currents Iu, Iv, and Iw are not matched with corresponding values determined based on the values of the respective d-axis and q-axis command currents Id* and Iq*.

The controller 60 according to a third modification can be configured to change at least one of a value of the steering velocity Vs and a value of the vehicle velocity Vc, which are input signals, i.e. input data items, to the controller 60 for calculating the d-axis and q-axis command currents Id* and Iq*. This eliminates the need of correcting the d-axis and q-axis command currents Id* and Iq* based on the respective d-axis and q-axis limit variables LId and LIq.

For example, the controller 60 of this third modification can be configured to change, at each of steps S18 and S20, at least one of the value of the steering velocity Vs and the value of the vehicle velocity Vc, which are used for calculating the d-axis and q-axis command currents Id* and Iq*, instead of changing the values of the respective d-axis and q-axis limit variables LId and LIq to thereby change the value of the corresponding one of the d-axis and q-axis command currents Id* and Iq* to be less than the calculation value of the corresponding one of the current limit variables LId and LIq calculated at step S13.

This third modification enables the determination at step S21 to become surely negative (NO at step S22), making it possible to reliably change the d-axis and q-axis command currents Id* and Iq*. Note that the controller 60 of this third modification can be configured to store, when determining that the motor currents Iu, Iv, and Iw are in the less-response situation as an affirmative determination at step S17 or S19, history information, which indicates that the d-axis and q-axis command currents Id* and Iq* will be limited, in the memory unit 60b.

When determining that that the motor currents Iu, Iv, and Iw are in the less-response situation, the controller 60 according to a fourth modification can be configured not to limit the d-axis and q-axis current command values Id* and Iq* instead of setting the d-axis and q-axis limit variables LId and LIq to the respective d-axis and q-axis maximum values MAXd and MAXq.

For example, the controller 60 of this fourth modification can be configured to terminate the present cycle of the limitation routine illustrated in FIG. 3, FIG. 5, or FIG. 6 without setting the d-axis and q-axis limit variables LId and LIq to the respective d-axis and q-axis maximum values MAXd and MAXq upon determining that the that the motor currents Iu, Iv, and Iw are in the less-response situation (YES at step S17 or step S19).

In particular, as illustrated in FIG. 7, the controller 60 of this fourth modification can be configured to determine whether at least one of the absolute values of the respective d-axis and q-axis command currents Id* and Iq* calculated at step S11 is greater than at least one of the corresponding absolute values of the d-axis and q-axis limit variables LId and LIq at step S21 after the operation at step S13.

Upon determining that none of the absolute values of the respective d-axis and q-axis command currents Id* and Iq* calculated at step S11 is greater than the corresponding one of the absolute values of the d-axis and q-axis limit variables LId and LIq (NO at step S21), the current limiter 64 determines not to limit the d-axis and q-axis command currents Id*, Iq* to the values of the respective d-axis and q-axis limit variables LId, LIq. Then, the controller 60 terminates the present cycle of the limitation routine.

Otherwise, upon determining that at least one of the absolute values of the respective d-axis and q-axis command currents Id* and Iq* calculated at step S11 is greater than at least one of the corresponding absolute values of the d-axis and q-axis limit variables LId and LIq (YES at step S21), the current limiter 64 performs the operations in steps S14 to S17 to thereby determine whether (1) The absolute value of the q-axis current Iqr is less than the absolute value of the q-axis command current Iq**

(2) The deviation amount Biq calculated at step S15 is larger than the current threshold THq Upon determining that the q-axis current Iqr is more than the absolute value of the q-axis command current Iq and the deviation amount Biq is larger than the current threshold THq (YES at step S17), the current limiter 64 determines that the followability of the q-axis current Iqr with respect to the q-axis command current Iq has a relatively decreased state. Then, the current limiter 64 determines not to limit the d-axis and q-axis command currents Id*, Iq* to the values of the respective d-axis and q-axis limit variables LId, LIq, thus terminating the present cycle of the limitation routine.

Otherwise, upon determining that the q-axis current Iqr is not more than the absolute value of the q-axis command current Iq and/or the deviation amount Biq is equal to or smaller than the current threshold THq (NO at step S17), the current limiter 64 determines that the followability of the q-axis current Iqr with respect to the q-axis command current Iq does not have a relatively decreased state (NO at step S17).

Then, the current limiter 64 performs the operations in steps S14 to S16, and S18 to thereby determine whether (1) The absolute value of the d-axis current Idr is less than the absolute value of the d-axis command current Id**

(2) The deviation amount Bid calculated at step S15 is larger than the current threshold THd Upon determining that the d-axis current Idr is more than the absolute value of the d-axis command current Id and the deviation amount Bid is larger than the current threshold THd (YES at step S18), the current limiter 64 determines that the followability of the d-axis current Idr with respect to the d-axis command current Id has a relatively decreased state. Then, the current limiter 64 determines not to limit the d-axis and q-axis command currents Id*, Iq* to the values of the respective d-axis and q-axis limit variables LId, LIq, thus terminating the present cycle of the limitation routine.

Otherwise, upon determining that the d-axis current Idr is not more than the absolute value of the d-axis command current Id and/or the deviation amount Bid is equal to or smaller than the current threshold THd (NO at step S18), the current limiter 64 determines that the followability of the d-axis current Idr with respect to the d-axis command current Id does not have a relatively decreased state (NO at step S18).

Then, the current limiter 64 limits the command current Id* and command current Iq* to the calculation values of the respective d-axis and q-axis limit variables LId and LIq at step S22.

The steering system 90 is not limited to a system for assisting the driver's steering operation using steering-assist torque. Specifically, the steering system 90 may be applied to autonomous vehicles, and may cause the controller 60 to control the amount of autonomous steering of such an autonomous vehicle based on the input signals sent from respective sensors installed in the autonomous vehicle including, for example, the sensors 11, 93, 94, and 95.

While illustrative embodiments of the present disclosure have been described herein, the present disclosure is not limited to the embodiments described herein. Specifically, the present disclosure includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. A motor driving device for controlling, based on a variable command current, a motor current to be supplied to a motor to thereby drive the motor, the motor driving device comprising:
   a current detector configured to detect a value of the motor current;
   a limit variable calculator configured to calculate a calculation value of a limit variable for limiting the command current;
   a determiner configured to:
     calculate an absolute deviation amount of the motor current with respect to the calculation value of the limit variable;
     determine whether
       an absolute value of the motor current is less than an absolute value of a limited value of the command current that is limited by the calculation value of the limit variable, and
       the absolute deviation amount is larger than a predetermined current threshold; and
     determine that the motor current is in a less-response situation to change of the command current in response to determining that:
       the absolute value of the motor current is less than the absolute value of the limited value of the command current that is limited by the calculation value of the limit variable, and
       the absolute deviation amount is larger than the predetermined current threshold, and
   a current limiter configured to determine whether to limit a value of the command current based on the calculation value of the limit variable in accordance with a result of determining whether the motor current is in the less-response situation to change of the command current.

2. The motor driving device according to claim 1, wherein:
   the current limiter is configured to determine to limit the value of the command current to the calculation value of the limit variable and correct the value of the command current to the calculation value of the limit variable upon determining that the motor current is not in the less-response situation to change of the command current.

3. The motor driving device according to claim 2, wherein:
   the current limiter is configured to determine not to limit the value of the command current and correct the calculation value of the limit variable upon determining that the motor current is in the less-response situation to change of the command current.

4. The motor driving device according to claim 3, wherein:
   the current limiter is configured to correct the calculation value of the limit variable to a maximum value upon determining that the motor current is in the less-response situation to change of the command current.

5. The motor driving device according to claim 1, further comprising:
   a command current calculator configured to calculate the value of the command current based on a predetermined physical input signal correlative to the command current,
   wherein:
   the current limiter is configured to determine to limit the value of the command current, and limit the value of the command current based on change of the input signal upon determining that the motor current is in the less-response situation to change of the command current.

6. The motor driving device according to claim 1, wherein:
   the determiner is configured to:
     obtain:
       a rate of increase of the command current;
       an angular velocity of the motor; and
       an angular acceleration of the motor; and
     change a possibility of the motor current being in the less-response situation in accordance with at least one of the rate of increase of the command current, the angular velocity of the motor, and the angular acceleration of the motor.

7. The motor driving device according to claim 1, wherein:
   the current limiter is configured to:
     determine, based on the relationship between the value of the motor current and the calculation value of the limit variable, whether the motor current, which has been in the less-response situation, is returned to a normal-response situation to change of the command current; and
     set the value of the limit variable to a selected one of the value of the motor current and the calculation value of the limit variable as an initial value such that an absolute value of the selected one of the value of the motor current and the calculation value of the limit variable is larger than an absolute value of the other thereof.

8. The motor driving device according to claim 7, wherein:
the current limiter is configured to change the value of the limit variable set by the current limiter such that an absolute value of the value of the limit variable gradually decreases.

9. The motor driving device according to claim 1, further comprising:
a storage that stores information indicative of the value of the command current being limited by the current limiter.

10. A motor driving device for controlling, based on a variable command current, a motor current to be supplied to a motor to thereby drive the motor, the motor driving device comprising:
a current detector configured to detect a value of the motor current;
a limit variable calculator configured to calculate a calculation value of a limit variable for limiting the command current;
a determiner configured to determine, based on a relationship between the value of the motor current and the calculation value of the limit variable, whether the motor current is in a less-response situation to change of the command current; and
a current limiter configured to determine whether to limit a value of the command current based on the calculation value of the limit variable in accordance with a result of determine whether the motor current is in the less-response situation to change of the command current;
a supply power calculator configured to calculate actual supply power to be actually supplied to the motor, based on the motor current; and
a target power calculator configured to calculate target power to be supplied to the motor, based on the value of the command current,
wherein the determiner is configured to:
compare the actual supply power with the target power to determine whether a shortage of the actual supply power relative to the target power; and
determine that the motor current is in the less-response situation to change of the command current upon the shortage of the actual supply power relative to the target power being larger than predetermined threshold power.

11. A steering system comprising:
a motor; and
a motor driving device for controlling, based on a variable command current, a motor current to be supplied to the motor to thereby drive the motor, the motor driving device comprising:
a current detector configured to detect a value of the motor current;
a limit variable calculator configured to calculate a calculation value of a limit variable for limiting the command current;
a determiner configured to:
calculate an absolute deviation amount of the motor current with respect to the calculation value of the limit variable;
determine whether
an absolute value of the motor current is less than an absolute value of a limited value of the command current that is limited by the calculation value of the limit variable, and
the absolute deviation amount is larger than a predetermined current threshold; and
determine that the motor current is in a less-response situation to change of the command current in response to determining that:
the absolute value of the motor current is less than the absolute value of the limited value of the command current that is limited by the calculation value of the limit variable, and
the absolute deviation amount is larger than the predetermined current threshold, and
a current limiter configured to limit a value of the command current based on the calculation value of the limit variable in accordance with a result of determining whether the motor current is in the less-response situation to change of the command current.

12. The steering system according to claim 11, wherein:
the determiner is configured to determine more easily that the motor current is in the less-response situation to change of the command current as a rate of change in an amount of driver's steering operation becomes higher.

13. A motor driving device for controlling, based on a variable command current, a motor current to be supplied to a motor to thereby drive the motor, the motor driving device comprising:
a current detector configured to detect a value of the motor current;
a limit variable calculator configured to calculate a calculation value of a limit variable for limiting the command current;
a first determiner configured to determine whether an absolute value of the value of the command current is larger than an absolute value of the value of the limit variable;
a second determiner configured to:
calculate an absolute deviation amount of the motor current with respect to the calculation value of the limit variable;
determine whether
an absolute value of the motor current is less than an absolute value of a limited value of the command current that is limited by the calculation value of the limit variable, and
the absolute deviation amount is larger than a predetermined current threshold, and
determine that the motor current is in a less-response situation to change of the command current in response to determining that:
the absolute value of the motor current is less than the absolute value of the limited value of the command current that is limited by the calculation value of the limit variable, and
the absolute deviation amount is larger than the predetermined current threshold, and
a current limiter configured to determine whether to limit the command current to the calculation value of the limit variable in accordance with a first result of determination by the first determiner and a second result of determination by the second determiner.

* * * * *